United States Patent [19]

Lerner et al.

[11] Patent Number: 5,433,057
[45] Date of Patent: Jul. 18, 1995

[54] HIGH SPEED SLEEVER

[75] Inventors: Hershey Lerner, Aurora; Dana J. Liebhart, Cuyahoga Falls, both of Ohio

[73] Assignee: Automated Label Systems Company, Twinsburg, Ohio

[21] Appl. No.: 963,059

[22] Filed: Oct. 27, 1992

Related U.S. Application Data

[63] Continuation-in-part of Ser. No. 789,257, Nov. 7, 1991.

[51] Int. Cl.$^6$ .................... B65B 11/08; B65B 53/00
[52] U.S. Cl. .................... 53/399; 53/291; 53/292; 53/441; 53/556; 53/585
[58] Field of Search .................... 53/137.1, 291, 292, 53/293, 294, 295, 441, 399, 459, 567, 556, 585, 253

[56] References Cited

U.S. PATENT DOCUMENTS

| | | |
|---|---|---|
| 1,955,949 | 4/1934 | Colton . |
| 2,068,107 | 1/1937 | Nygard . |
| 2,103,302 | 12/1937 | Strout . |
| 2,164,026 | 6/1939 | Seymour . |
| 2,579,458 | 12/1951 | Allen et al. . |
| 2,623,673 | 12/1952 | Holstein . |
| 2,630,956 | 3/1953 | Pomeroy et al. . |
| 2,652,963 | 9/1953 | Pomrey . |
| 2,660,353 | 11/1953 | Gampp . |
| 2,680,549 | 6/1954 | Levy . |
| 2,765,607 | 10/1956 | Aguilar et al. . |
| 2,814,173 | 11/1957 | Holstein . |
| 2,815,628 | 12/1957 | Eddison et al. . |
| 2,834,170 | 5/1958 | Robinson . |
| 2,835,088 | 5/1958 | Eddison et al. . |
| 2,846,835 | 8/1958 | Aguilar et al. . |
| 2,884,328 | 4/1959 | Johnson . |
| 2,890,558 | 6/1959 | Eddison et al. . |
| 2,967,384 | 1/1961 | Wilson . |
| 3,267,566 | 8/1966 | Ouellette . |
| 3,551,258 | 12/1970 | Galvanoni et al. . |
| 3,558,404 | 1/1971 | Metcalf . |
| 3,738,210 | 6/1973 | Fujio . |
| 3,799,834 | 3/1974 | Horvath . |
| 3,811,986 | 5/1974 | Mare et al. . |
| 3,850,777 | 11/1974 | Mare et al. . |
| 3,861,118 | 1/1975 | Muto . |
| 3,974,628 | 8/1976 | Konstantin . |
| 4,013,496 | 3/1977 | Amberg . |
| 4,016,704 | 4/1977 | Fujio . |
| 4,102,728 | 7/1978 | Smith . |

(List continued on next page.)

FOREIGN PATENT DOCUMENTS

| | | |
|---|---|---|
| 9033682 | 5/1983 | Australia . |
| 79034 | 5/1983 | European Pat. Off. . |
| 111244 | 6/1984 | European Pat. Off. . |
| 2440821 | 6/1980 | France . |
| 2599709 | 12/1987 | France . |
| 746653 | 3/1956 | United Kingdom . |
| 1588412 | 4/1981 | United Kingdom . |
| 2122966 | 1/1984 | United Kingdom . |
| 2145963 | 4/1985 | United Kingdom . |

OTHER PUBLICATIONS

Patent Abstract of Japan—vol. 10, No. 77 (M-464)(2134) dated Mar. 26, 1986.

*Primary Examiner*—Linda Johnson
*Attorney, Agent, or Firm*—Watts, Hoffmann, Fisher & Heinke Co.

[57] ABSTRACT

A method and apparatus for placing sleeves on bottles and other objects is disclosed. In particular, a high speed method and apparatus having a plurality of sleeving stations for placing sleeves on bottles is disclosed. Each sleeving station includes a circularly arranged set of relatively movable parallel pins which are operable to contract or expand. A label transporter deposits a sleeve on the pins when they are contracted. The pins expand to stretch the sleeve. A bottle and the pins are then moved relative to one another to place the bottle inside the stretched sleeve. A gas flow is provided between the bottle and the sleeve to reduce friction. The sleeved bottle is then stripped from the pins. The method occurs without starts and stops by the bottle or the sleeve and is thus capable of very high production rates.

18 Claims, 26 Drawing Sheets

U.S. PATENT DOCUMENTS

| | | |
|---|---|---|
| 4,144,631 | 3/1979 | Fujio . |
| 4,184,309 | 1/1980 | Amberg . |
| 4,188,249 | 2/1980 | Fujio . |
| 4,237,675 | 12/1980 | Myers . |
| 4,243,466 | 1/1981 | Lindee . |
| 4,245,452 | 1/1981 | Fujio . |
| 4,286,421 | 9/1981 | Fujio . |
| 4,287,700 | 9/1981 | Fujio . |
| 4,293,364 | 10/1981 | Fujio . |
| 4,354,333 | 10/1982 | McArdle . |
| 4,357,788 | 11/1982 | Amberg . |
| 4,387,553 | 6/1983 | Strub et al. . |
| 4,388,797 | 6/1983 | Shields . |
| 4,412,876 | 11/1983 | Lerner ................................. 53/291 |
| 4,447,280 | 5/1984 | Malthouse . |
| 4,460,432 | 7/1984 | Jorss . |
| 4,514,966 | 5/1985 | Konstantin . |
| 4,519,186 | 5/1985 | Winter et al. . |
| 4,562,684 | 1/1986 | Dreher . |
| 4,693,059 | 9/1987 | O'Donnell . |
| 4,694,633 | 9/1987 | Fujio . |
| 4,765,121 | 8/1988 | Konstantin et al. . |
| 4,801,348 | 1/1989 | Takagaki . |
| 4,910,941 | 3/1990 | Nagano et al. . |
| 4,922,683 | 5/1990 | Connolly . |
| 4,950,350 | 8/1990 | Zodrow et al. . |
| 5,024,049 | 6/1991 | Strub et al. . |
| 5,060,367 | 10/1991 | Vandevoorde . |
| 5,101,613 | 4/1992 | Wilhelm et al. . |

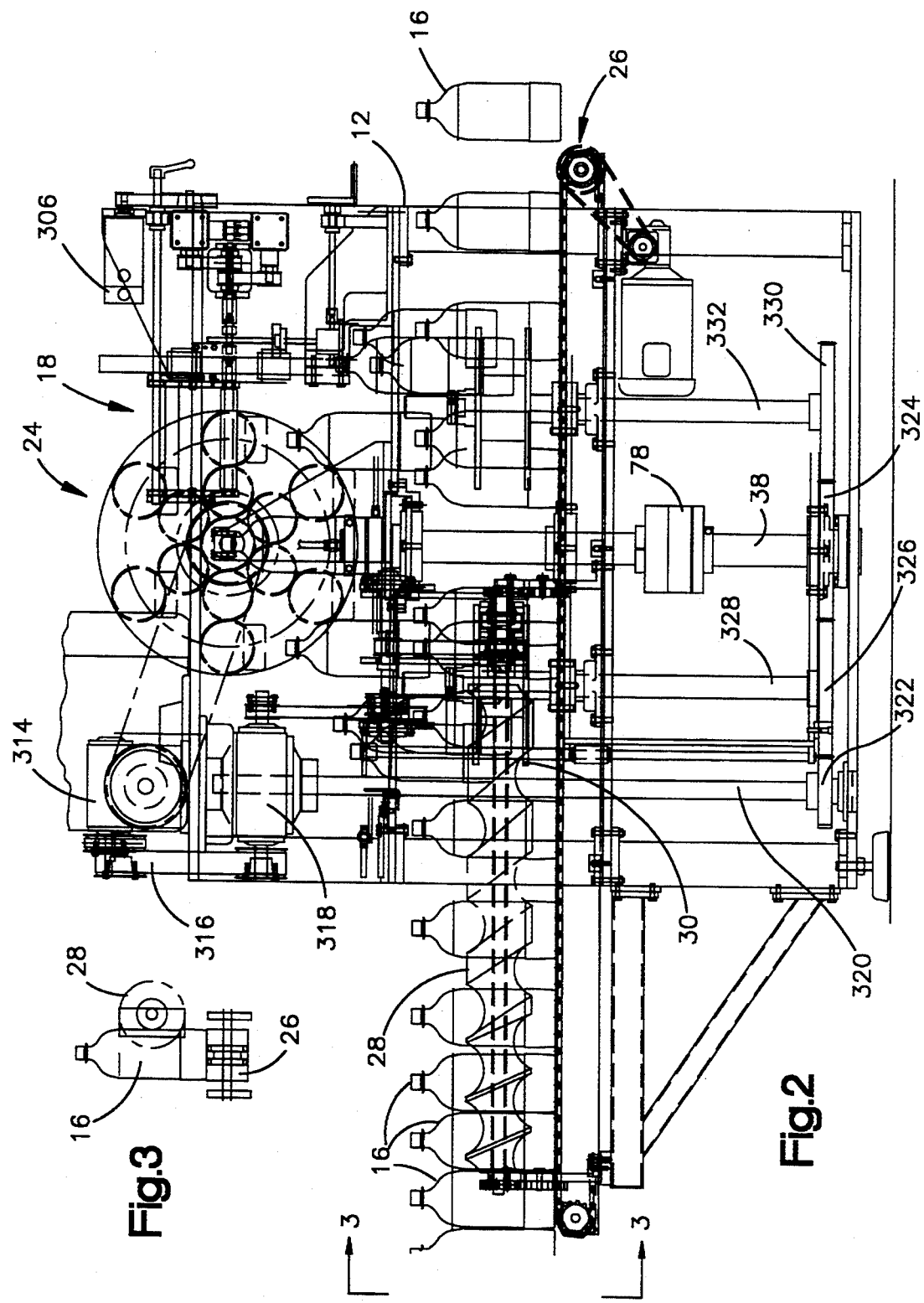

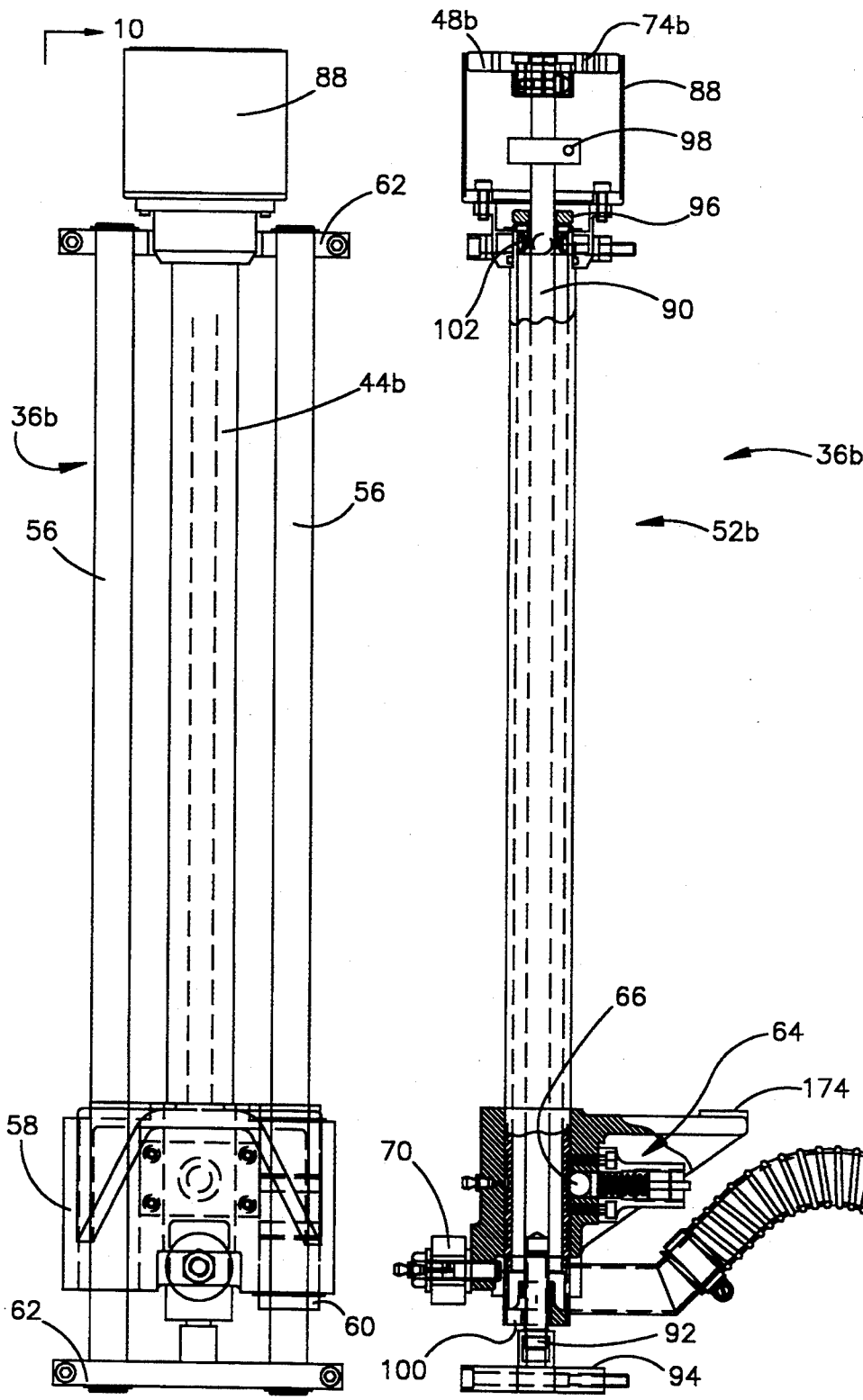

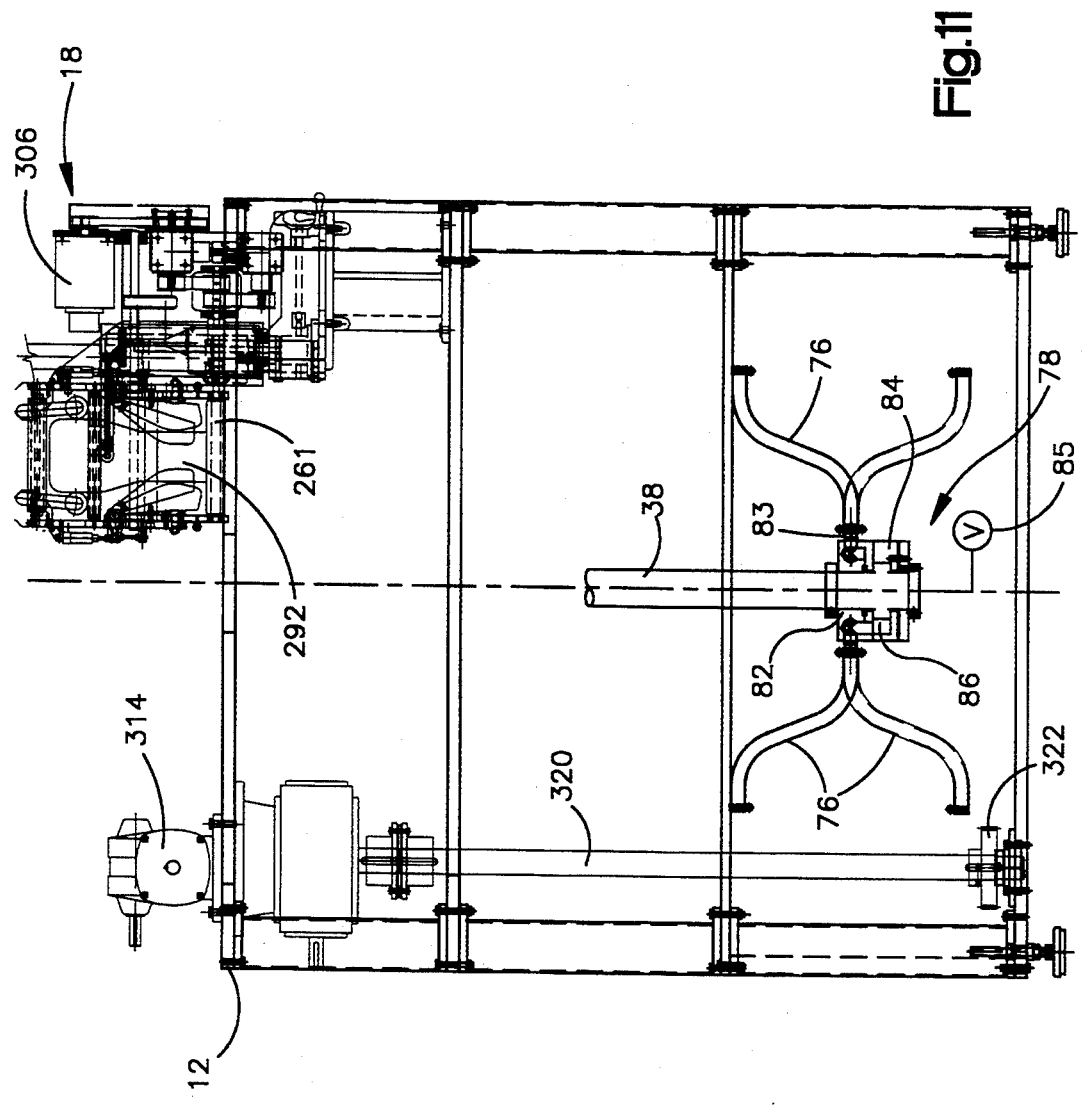

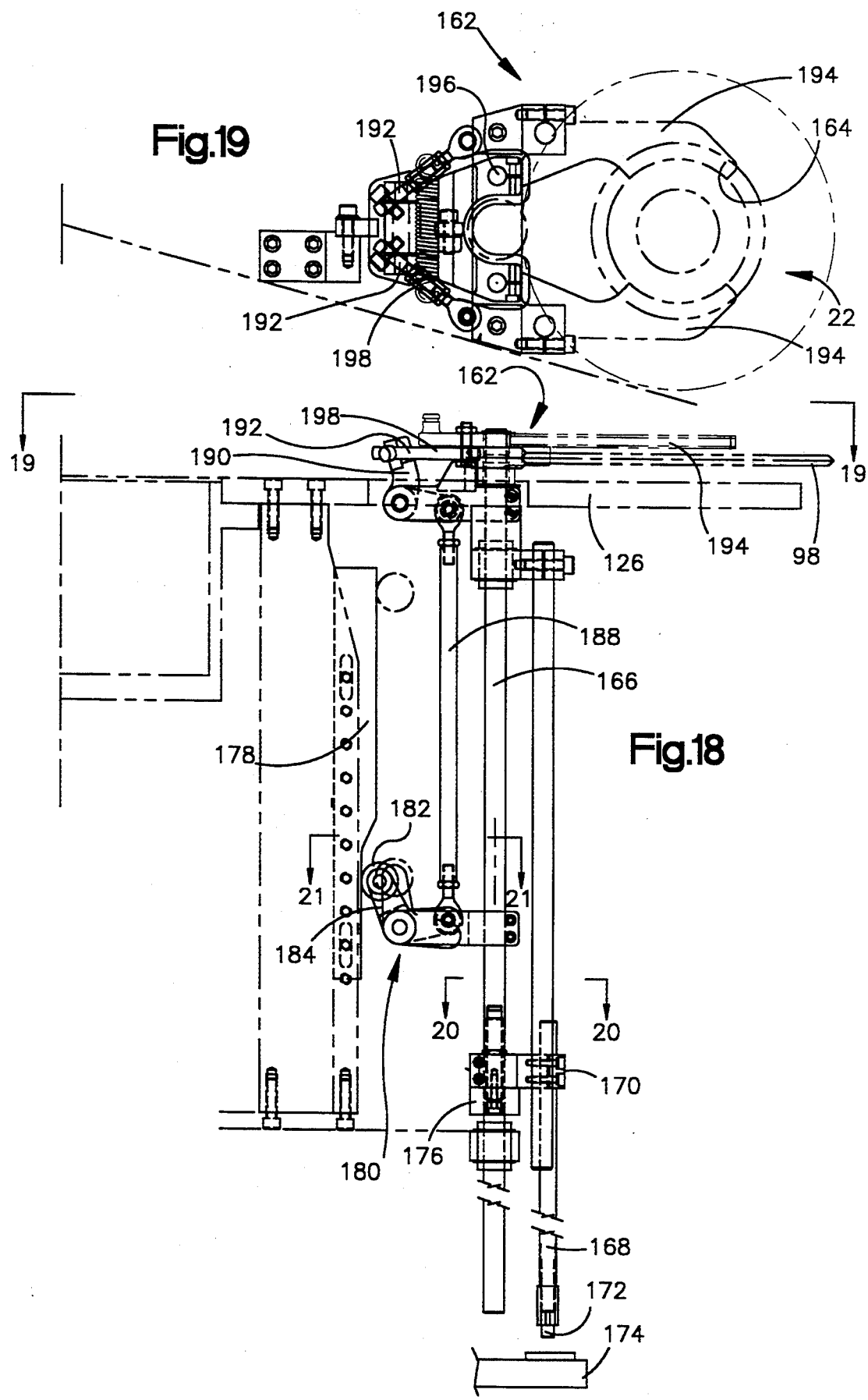

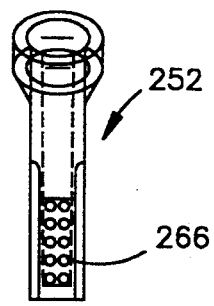
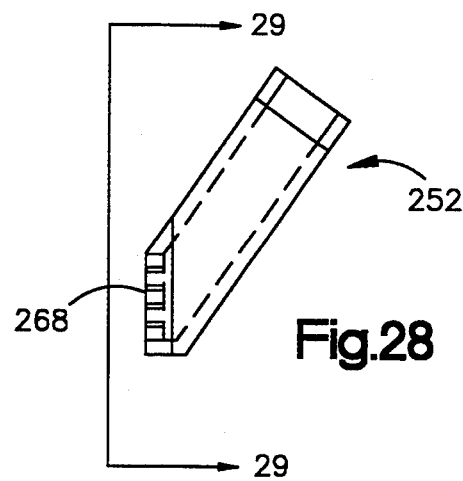
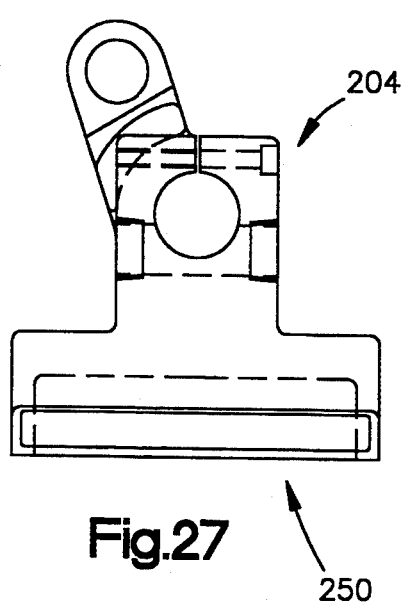
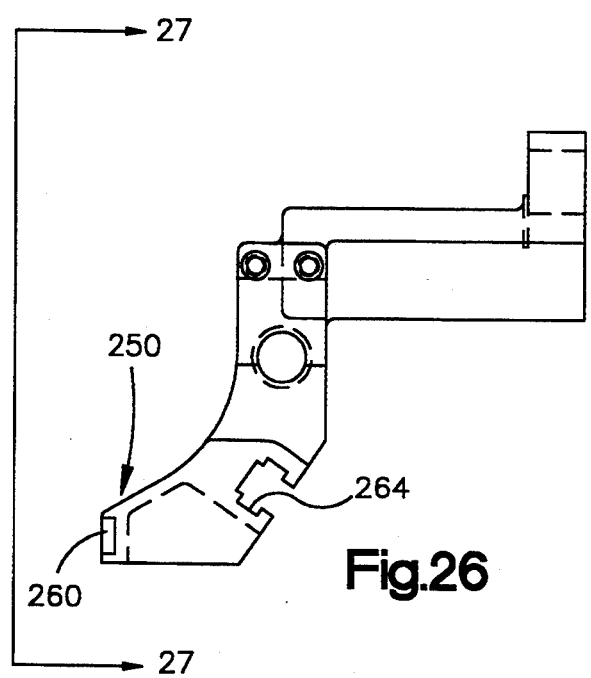

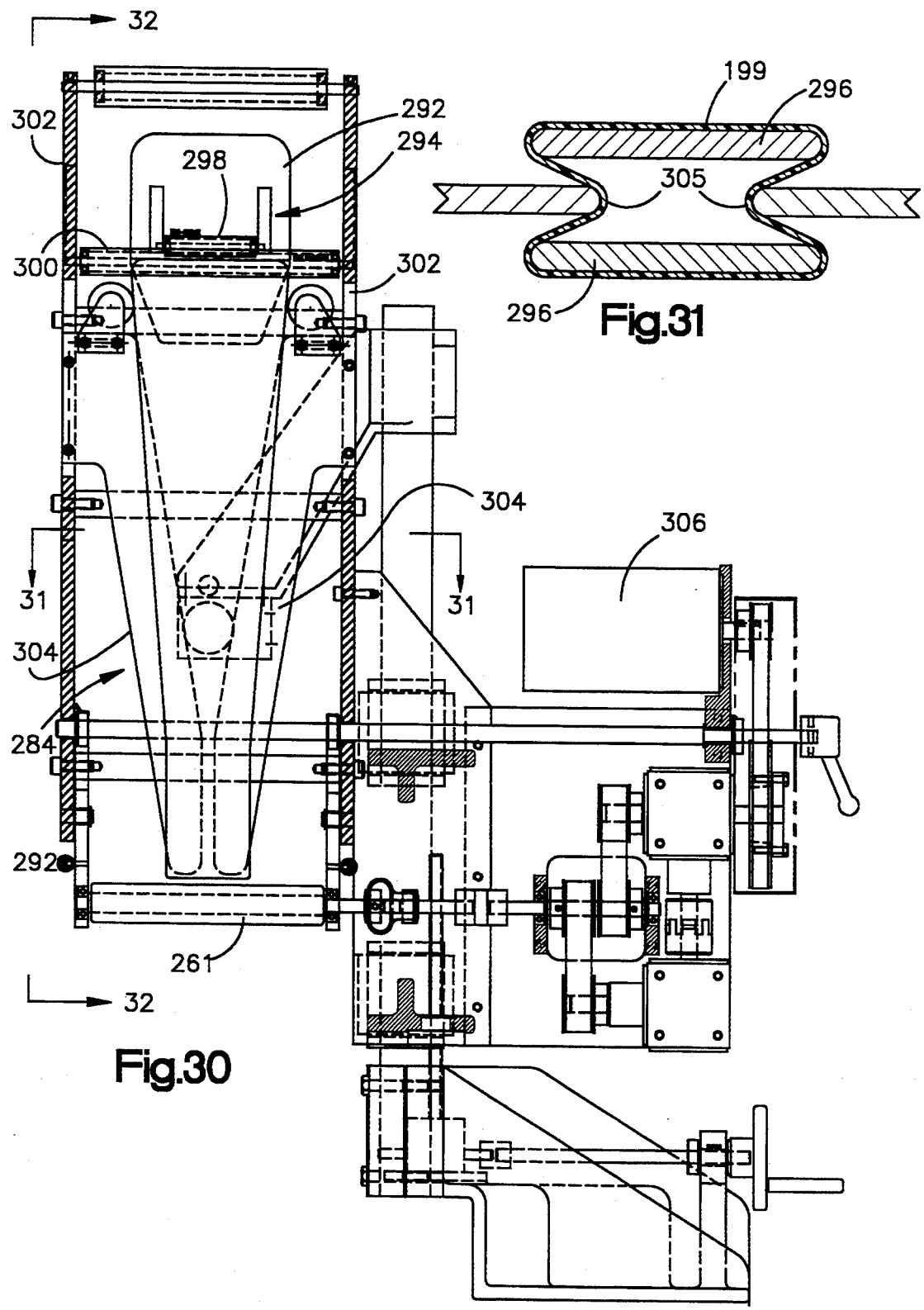

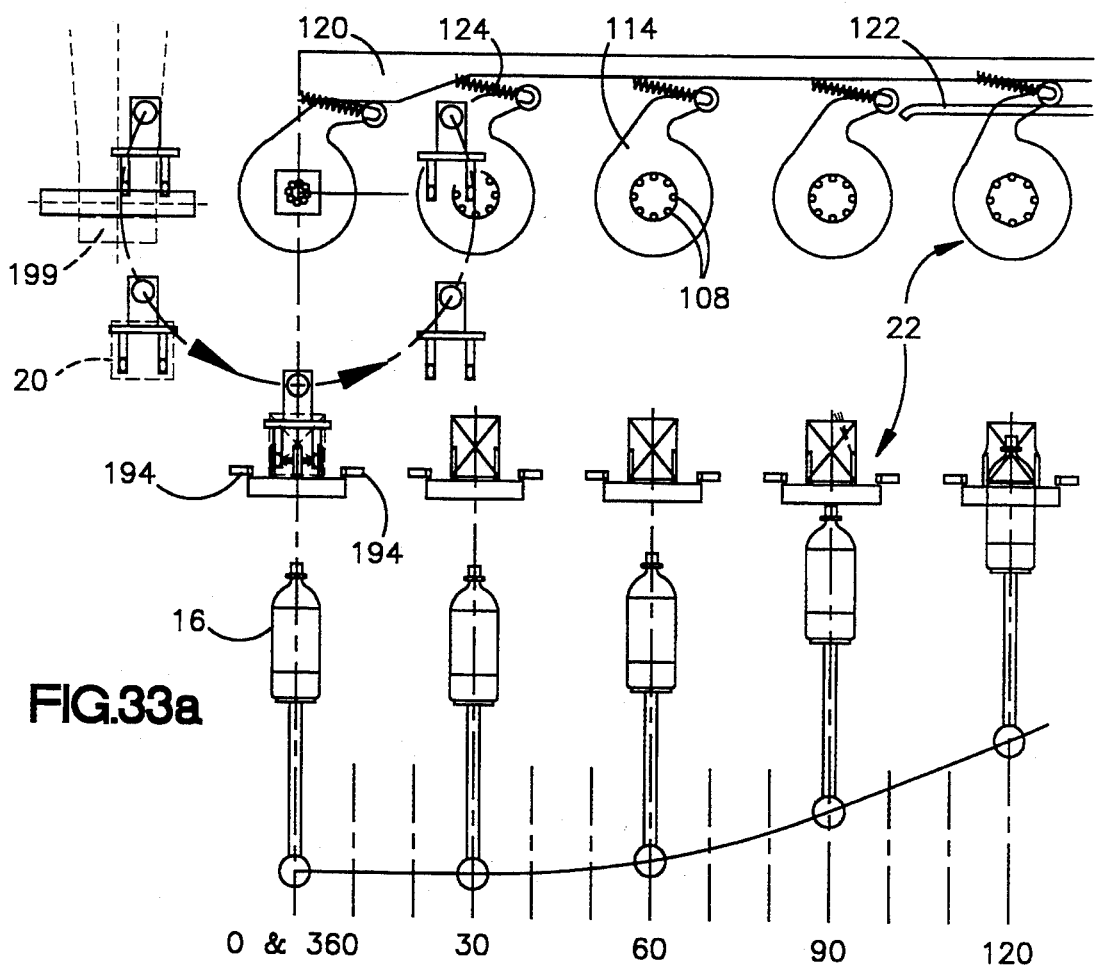
FIG.33a
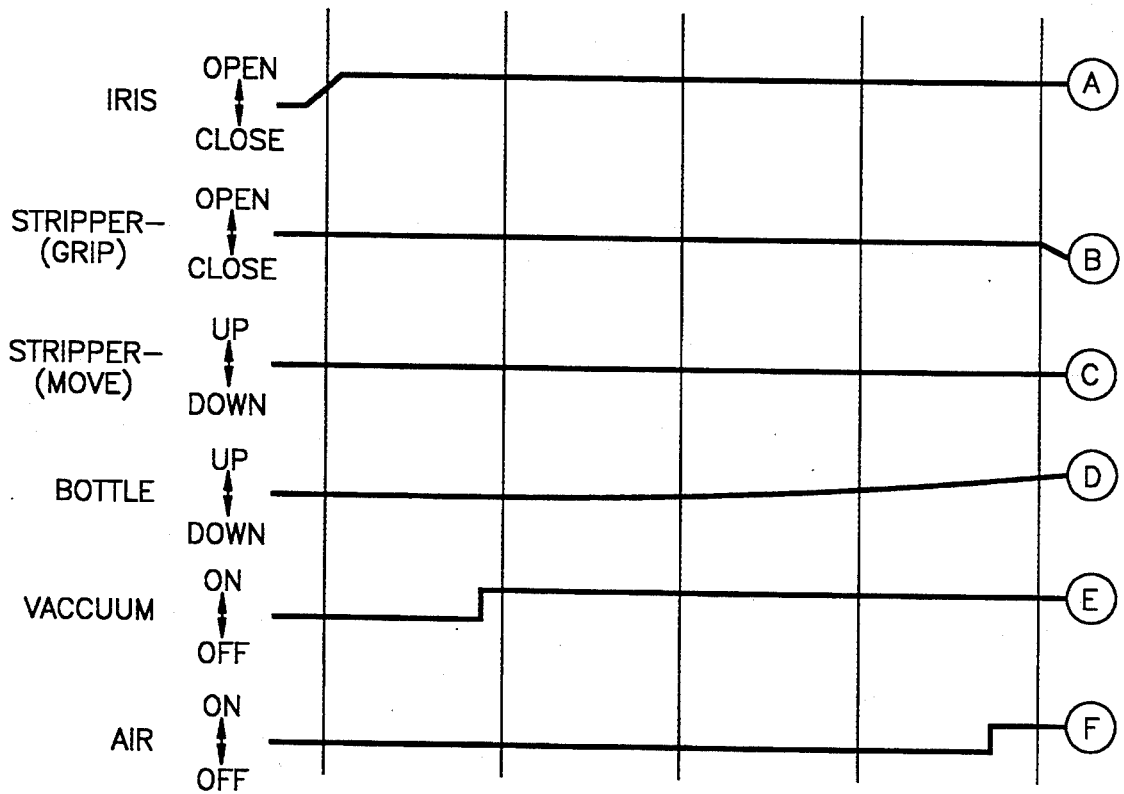

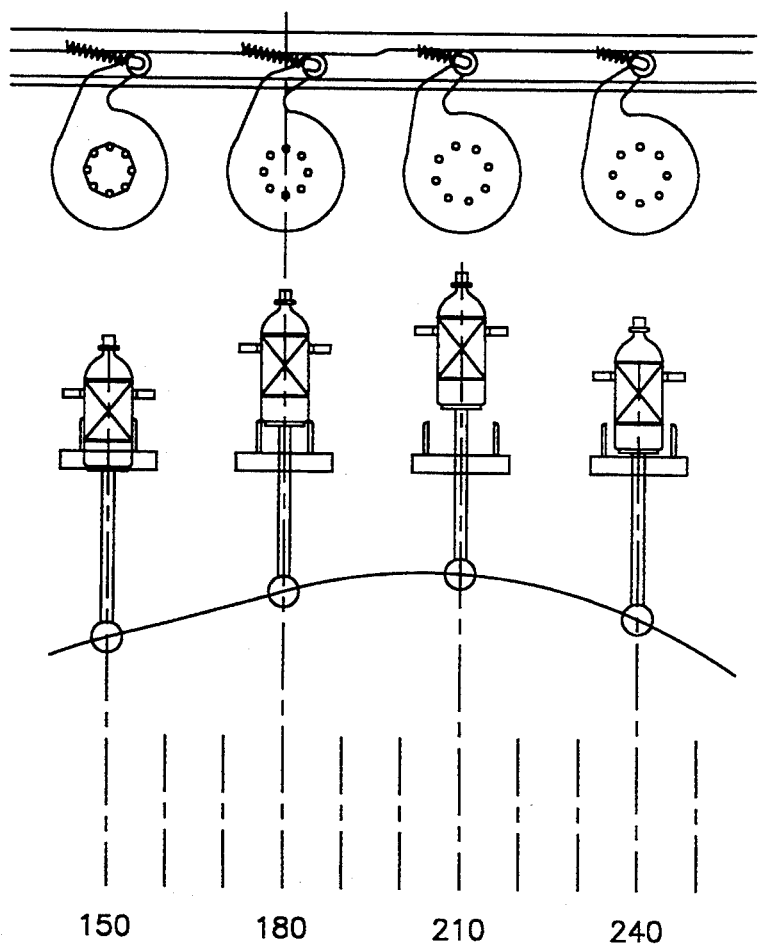
FIG.33b
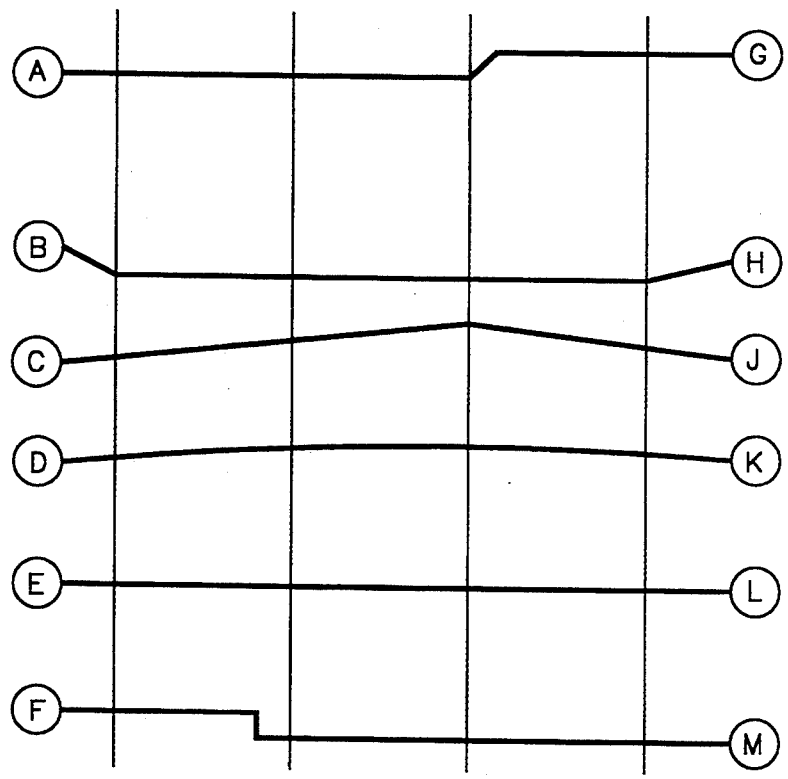

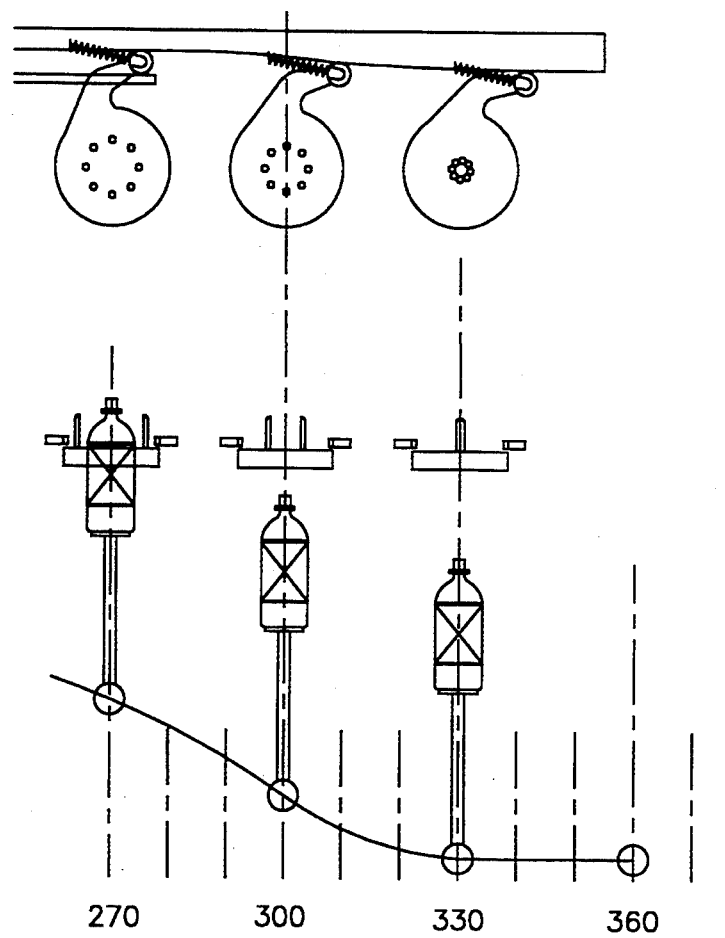
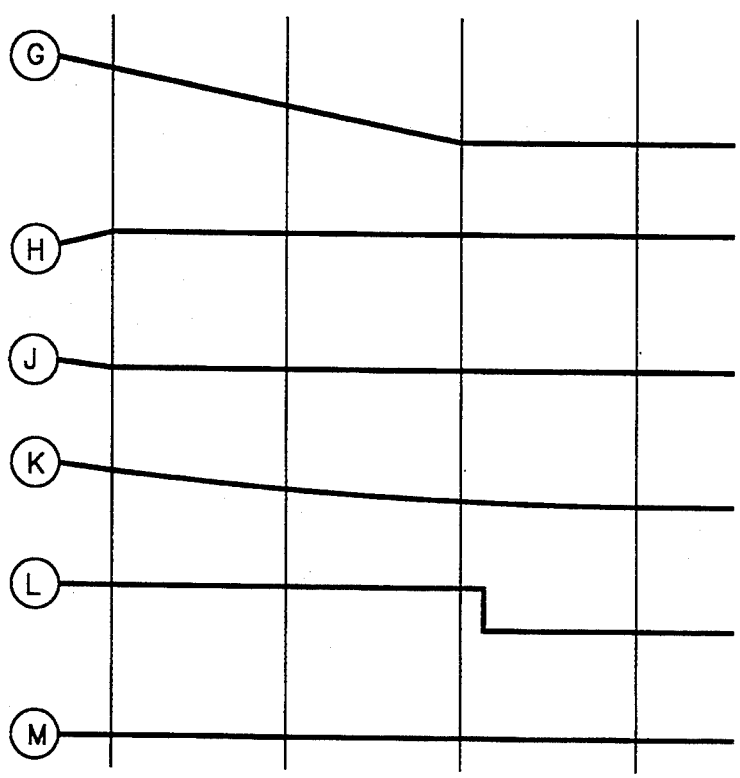
FIG.33c

HIGH SPEED SLEEVER

This application is a continuation-in-part of application Ser. No. 789,257 filed Nov. 7, 1991.

BACKGROUND OF THE INVENTION

1. Field of the Invention

This invention relates to apparatuses and methods for applying sleeves to objects, and more particularly, for placing plastic sleeves on objects in a continuous cycle at very high speeds.

2. Reference to Patents and Applications

"Control Marking Detector," U.S Pat. No. 4,392,056.
"Labeling Apparatus," U.S. Pat. No. 4,412,876.
"Non-Migrating Control Indicia for a Plastic Web or Sheet Article," U.S. Pat. No. 4,467,207.
"Automated Manufacturing Monitoring," U.S. Pat. No. 4,565,592.
"Labelling Apparatus," U.S. Pat. No. 4,620,888.
"Continuous Web Registration," U.S. Pat. No. 4,680,205.
"Process for Performing Work on a Continuous Web," U.S. Pat. No. 4,926,048.
"Continuous Web Registration," U.S. Pat. No. 4,945,252.
"Labeling Apparatus," U.S. Pat. No. 4,944,825.
"Method and Apparatus for Registering Bottles," application Ser. No. 708,509.

3. Background Information

The labeling of product containers such as bottles, can be done by various methods. Early methods involved either printing information directly onto the container or alternatively printing the information on a label which was then adhesively bonded to the container. Machines which wrap an adhesive label around a bottle have been developed which have production rates in excess of 300 bottles per minute.

Recently, it has become popular to label bottles with tubular, flexible, plastic sleeves without adhesives. In particular, non-adhesive sleeves have become popular for labeling plastic "two liter" bottles commonly used for soft drinks.

When an adhesive label is used on a plastic bottle, the portion of the bottle contacting the adhesive is not economically recoverable with conventional recycling processes. When non-adhesive sleeves are used, the sleeve and all or most of the bottle is recoverable because the sleeve is easily separated from the bottle. Some governments have passed, and it is expected that others will pass, laws mandating fully recoverable bottles.

Apparatuses and methods for automatically placing tubular non-adhesive sleeves on empty containers have been developed. More recently, apparatuses and methods for applying sleeves to filled bottles have been developed by the present assignee with considerable success. These are disclosed in the assignee's referenced patents for "Labeling Apparatus" and in the assignee's co-pending application for "Method and Apparatus for Registering Bottles."

Labeling filled bottles presents special problems for labeling machines due to the added mass of the fluid contents and the effect of the fluid contents moving within the bottle. Further provision must be made for the possibility that a labeling machine malfunction may cause a filled bottle to be crushed resulting in the contents being released.

In the labeling industry, there is a great demand for non-adhesive labeling machines which have high production rates and which can label either filled or empty bottles. Heretofore, the present assignee has been able to achieve sleeving rates of approximately 90 bottles per minute with the apparatuses of the referenced patents. This rate is sufficient for many applications, however, it is less than what can be achieved with adhesive, wrap-around label machines.

With sleeving apparatuses of the referenced patents and in most prior art machines and processes, the bottles are stopped before the sleeve is applied and accelerated afterwards. Starting and stopping the bottles greatly limits the production rate of a machine. Therefore, there has been a great need for a machine which can apply non-adhesive sleeves to bottles, whether full or empty, while the bottles are moving at high speeds. In addition, there is a demand for machines which take up less space, are able to accommodate varying bottle shapes and sizes, are able to position sleeves on objects with a high degree of accuracy, and have a low, frequency of product damage.

In prior art sleeving machines such as the assignee's Labeling Apparatus disclosed in U.S. Pat. No. 4,620,888, the thickness of the sleeves is very critical. The thickness of the sleeve is generally a function of the frictional forces between the sleeve and the bottle. These frictional forces vary widely depending on the characteristics of the sleeve and the bottle.

The effort to pull the sleeve over the bottles is resisted by the frictional forces between the sleeve and bottle. Sleeves for bottles are initially smaller in diameter than the bottle being sleeved. Thus, each sleeve is stretched as it is pulled over each bottle. Other factors can exacerbate the frictional resistance to pulling a sleeve over a bottle. For example, some types of plastic used for bottles such as polyethylene have a low friction surface, but others such as PET material have a very high friction surface. Some labels have printing on their inside surfaces. Such printing increases the friction between the sleeve and the bottle. Thicker sleeves are more difficult to pull down over a bottle because they resist stretching and thus increase sleeve-bottle friction. Some bottles have shoulders over which a sleeve must be stretched. Additives may be added to the sleeve material to make them more stretchable, however, this adds to the cost of the sleeves.

In general, it is desirable to use thinner sleeves. Thinner sleeves contain less material and are thus less costly. However, in some applications, it is desirable to use a thicker sleeve. For example, some bottles rely on a heavy sleeve for added hoop strength. Thus, in prior art machines, for a given bottle type and sleeve requirement, the sleeve thickness and sleeve material ingredients are painstakingly selected. There is a need for a sleeving machine which permits greater flexibility in matching sleeve thicknesses and sleeve types to particular applications.

SUMMARY OF THE INVENTION

The present invention overcomes the above-noted and other problems by providing a method and apparatus for placing film sleeves on objects at very high speeds. The machine made in accordance with the present invention includes a set of sleeve holders each having a set of pins arranged about a center axis. The pins are pivotally mounted to move toward and away from the center axis. Each sleeve holder is adapted to stretch a sleeve for placement around an object.

A sleeve transporter is provided for placing film sleeves about the pins. A duct system provides a lubricating gas film between an object and a sleeve as the sleeve is positioned around the object.

A set of elevator devices are provided, each for moving an associated one of the sleeve holders and an object being sleeved relative to one another to locate the object inside the sleeve. Each elevator is operable to separate a sleeved object from the pins.

In the preferred and illustrated form of the invention, a plurality of sleeve holders are circularly arranged around a carousel. Aligned with each sleeve holder is a pedestal for supporting an object. As the carousel rotates about its axis, the elevator device moves the pedestals, and the objects supported thereon, relative to the sleeve holders in accordance with a predetermined cycle.

The preferred form of the machine further includes a gripper device for gripping a sleeved bottle for a portion of the sleeving cycle. The gripper device holds a sleeve in place on the object as the object is moved with respect to the pins to assure proper sleeve placement.

The sleeve transporter includes two co-axial wheels mounted for synchronous rotation. Each wheel has a plurality of sleeve-handling tools rotatably mounted thereon. Each sleeve handling tool is aligned with and opposed to a corresponding sleeve handling tool on the other wheel to form a plurality of pairs of opposed sleeve handling tools. The pairs are operable at one rotational position of the wheels to come together to grip and separate a sleeve at a sleeve supply station, and at another rotational position to deposit a sleeve on an aligned set of pins.

The sleeve supply station is provided for supporting a web of sleeves joined end to end along lines of weakness. A sleeve feeding device is provided for feeding the length of sleeves through the supply station. The supply station includes a guide device for forming folds in the walls of each sleeve as it passes through the station. The folds create a tendency in the sleeves to spring open when free of the guide device which facilitates placement of the sleeves on the sets of pins.

The method of placing a sleeve on an object includes the steps of: putting the film sleeve on the pins; stretching the film sleeve by moving the pins; positioning the object inside the sleeve while simultaneously flowing air between the sleeve and the object; stopping the air flow; and separating the now sleeved object from the pins. When these steps are performed on multiple, rapidly moving sets of pins and multiple rapidly moving objects, very high throughput is achieved. In addition, the flowing of air between the sleeve and the object reduces friction and permits greater flexibility in the choice of sleeve thickness and in the choice of material ingredients of the sleeve.

In an alternate embodiment of the conveyor system, unsleeved bottles are sequentially deposited onto the elevator devices while each is in a lowered condition. After the sleeving step, and while each elevator is in a raised condition, the bottles are removed from their associated pedestal to an output conveyor.

Accordingly, the objects of the invention are to provide a novel and improved sleeving machine and a method of sleeving objects.

BRIEF DESCRIPTION OF THE DRAWINGS

FIG. 2 is a somewhat schematic front elevation view of the machine;

FIG. 3 is a schematic partial view seen approximately from the plane indicated by the line 3—3 of FIG. 2;

FIG. 9 is a front elevation view of a second embodiment of the elevator apparatus;

FIG. 10 is a side elevation view seen approximately from the plane indicated by the line 10—10 of FIG. 9;

FIG. 11 is a front elevation view of selected parts of the machine;

FIG. 18 is a side elevation view of the sleeve position mechanism;

FIG. 19 is a plan view seen approximately from the plane indicated by the line 19—19 of FIG. 18;

FIG. 26 is a side view of a transporter tool head;

FIG. 27 is a front view as seen approximately from the plane indicated by the line 27—27 of FIG. 26;

FIG. 28 is a side elevation view of a transporter vacuum tip;

FIG. 29 is a front view as seen approximately in the direction of the plane indicated by the line 29—29 of FIG. 28;

FIG. 30 is a front elevation view of the label supply station;

FIG. 31 is an enlarged schematic sectional view as seen in the direction of section 31—31 of FIG. 30 with the sleeve web incorporated;

FIG. 33a, b, and c together form a timing diagram illustrating the operation of various parts of the machine with respect to the rotational position of one labeling station;

DESCRIPTION OF THE PREFERRED EMBODIMENT

Figure 1:
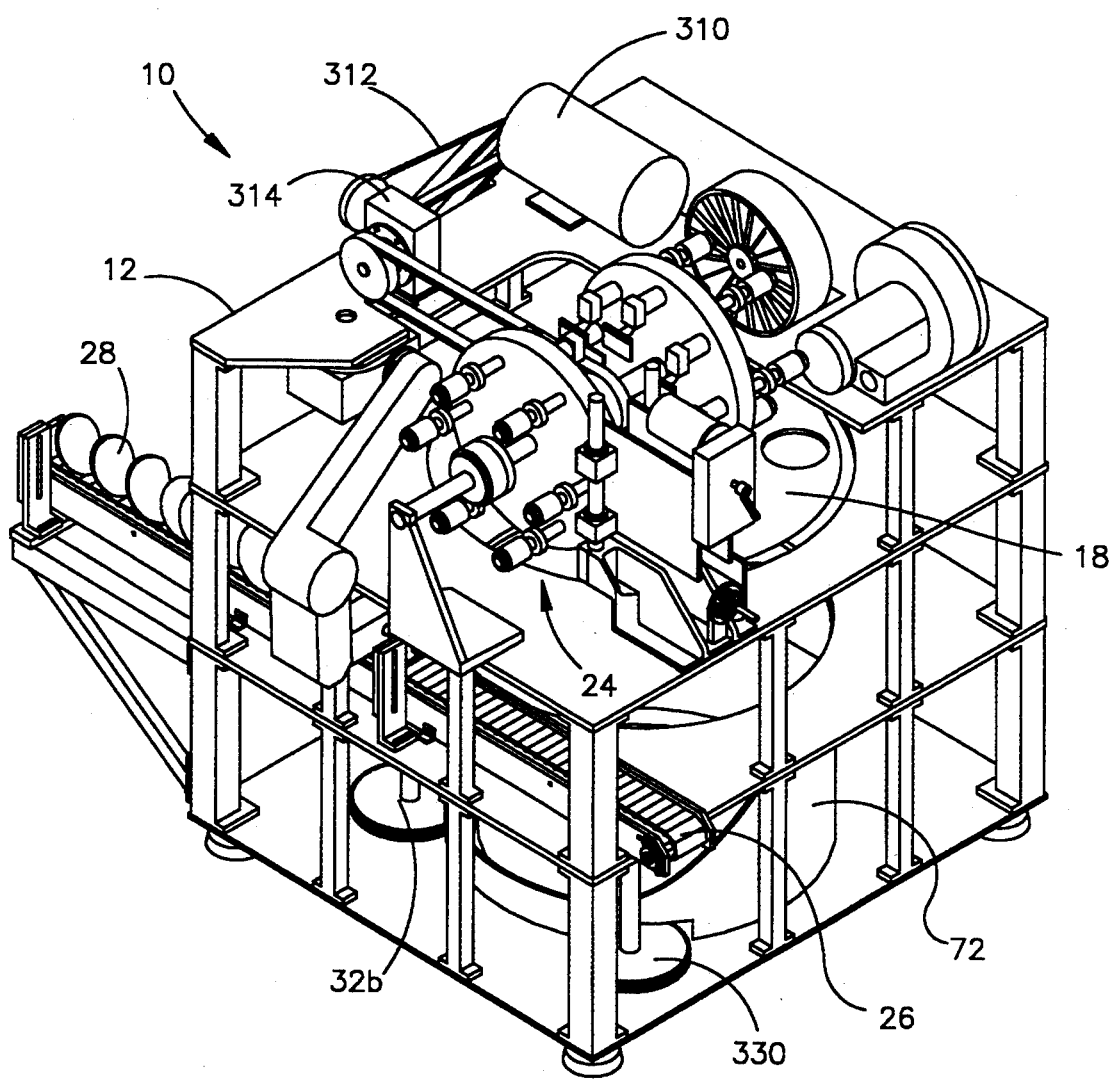
FIG. 1 is a schematic perspective view of the sleeving machine constructed according to a preferred embodiment of the invention.
Figure 4:
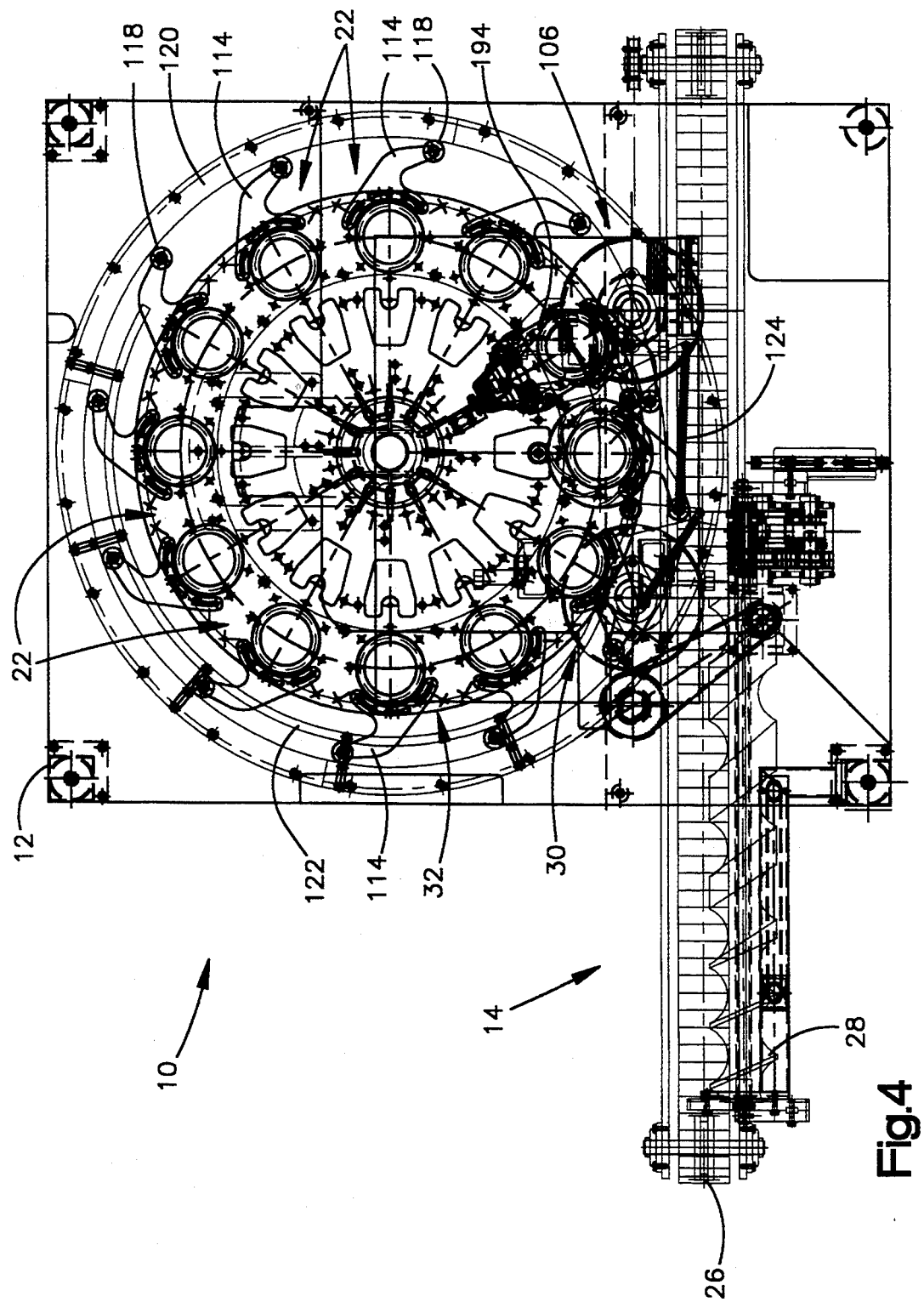
FIG. 4 is a plan view of selected parts of the machine.

Referring to FIGS. 1, 2 and 4, the high-speed sleeving machine 10 includes a frame 12, a conveyor system 14 for transporting bottles 16, a set of sleeving stations 22 for applying sleeves 20 to the bottles 16, a sleeve supply station 18 for providing a supply of sleeves, and a sleeve transporter 24 for transporting sleeves from the supply station 18 to the sleeving stations 22.

CONVEYOR SYSTEM

Referring to FIG. 2, a stream of bottles 16 enter the sleeving machine 10 on a flat belt conveyor 26. A conventional screw shaft 28 having a varying thread pitch engages the bottles 16 on the flat top conveyor 26 and causes them to be spaced from one another along the belt. When tall slender bottles are being sleeved, it is preferable to use two screw shafts (not illustrated) to prevent the bottles from tipping. One screw is positioned to engage the upper portion of the bottle and one positioned to engage the lower portion of the bottle.

Figure 5:
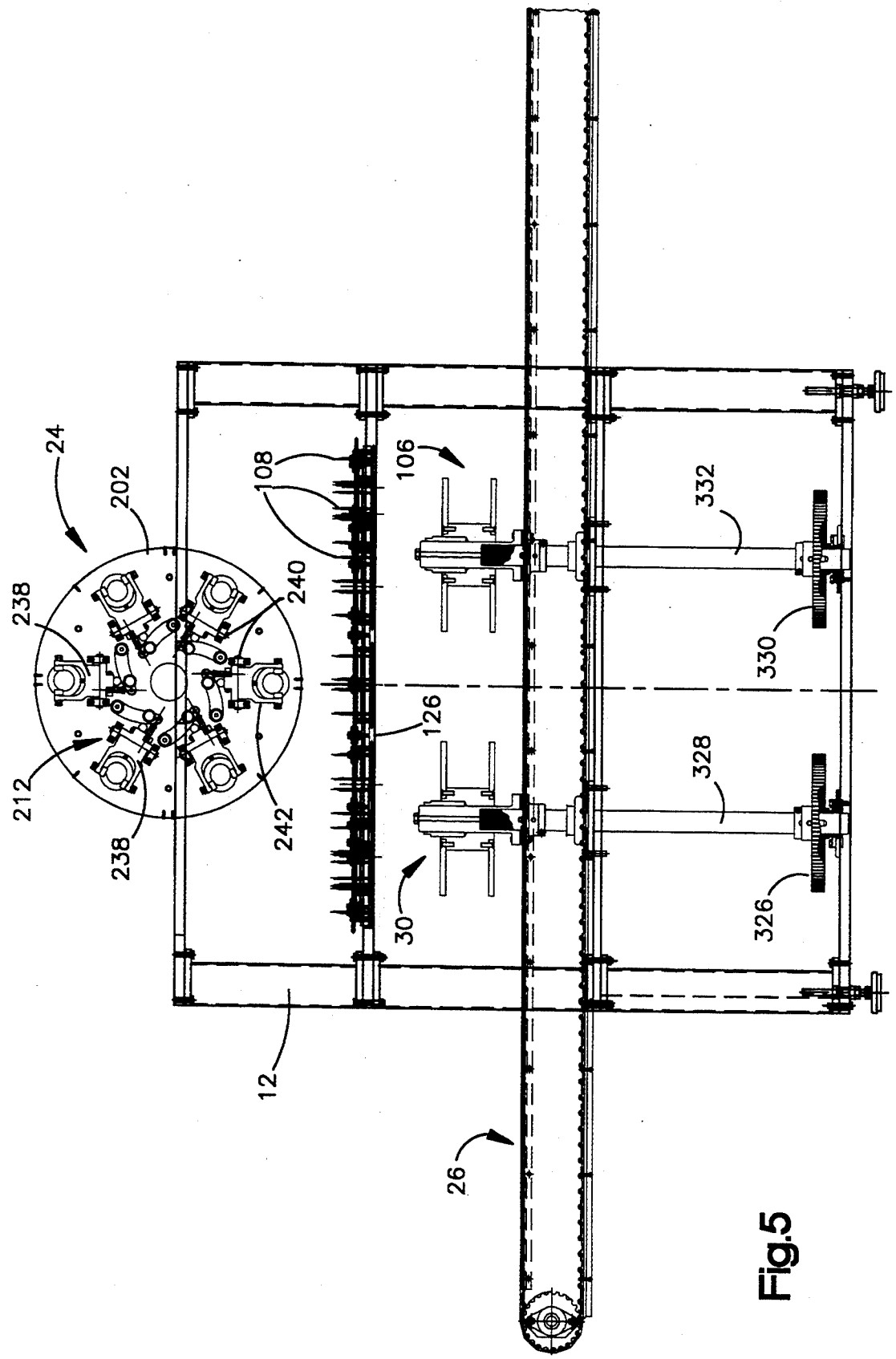
FIG. 5 is a front elevation view of selected parts of the machine.
Figure 6:
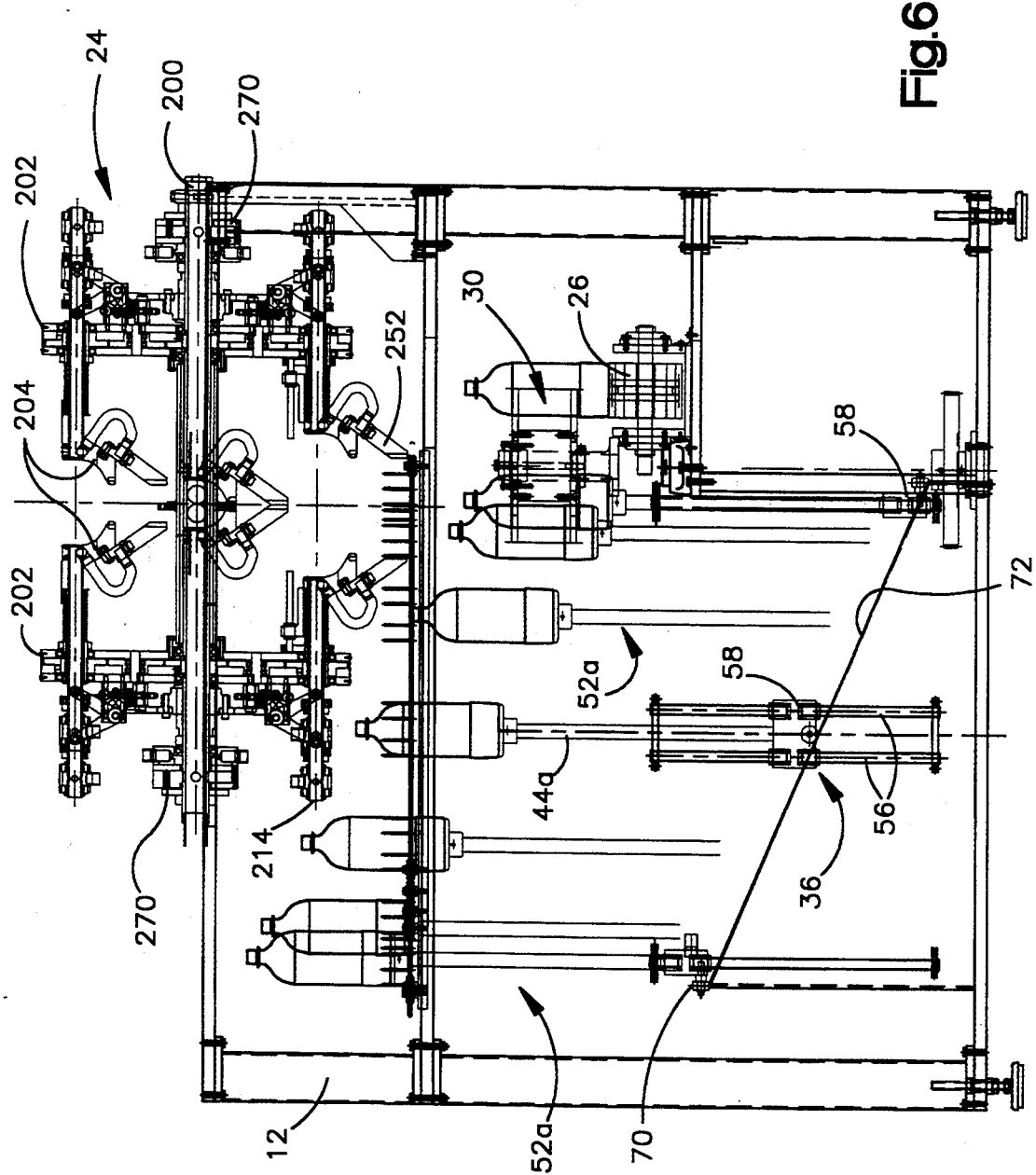
FIG. 6 is a left side elevation view of selected parts of the machine.

Referring to FIGS. 4,5 and 6, near the downstream end of the screw shaft 28 is an input conveyor 30 for transferring bottles from the fiat top conveyor 26 to a carousel conveyor 32. The input conveyor is preferably a star-wheel conveyor which is well known in the bottle conveying art. The star-wheel conveyor 30 comprises a plurality of bottle-engaging notches (not shown), each of which engages a single bottle and slides it across a flat surface (not shown) and onto the carousel conveyor 32. The star-wheel conveyor 30 and the carousel 32 are timed such that each bottle is transferred directly to an elevator 36 on the moving carousel. Abutments (not shown) are located at each elevator position on the carousel 32 to stop each bottle's lateral movement as it arrives on the elevator 36. The carousel 32 is essentially a turntable rotatably mounted on an axle 38 with a plurality of sleeving stations 22 and associated elevators 36 circumferentially arranged thereon.

Figure 7:
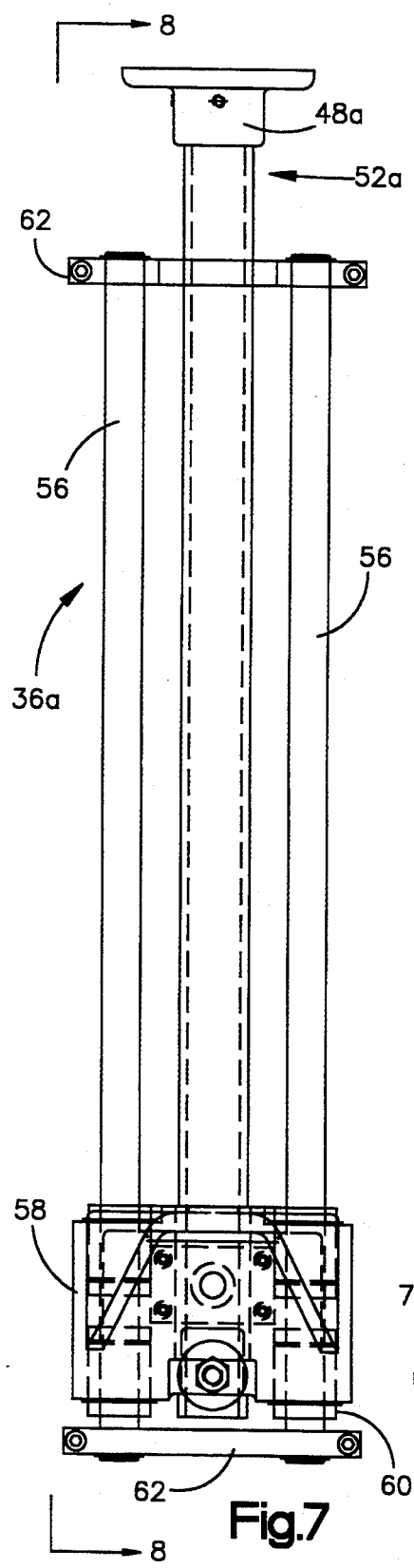
FIG. 7 is a front elevation view of a first embodiment of the elevator apparatus.
Figure 8:
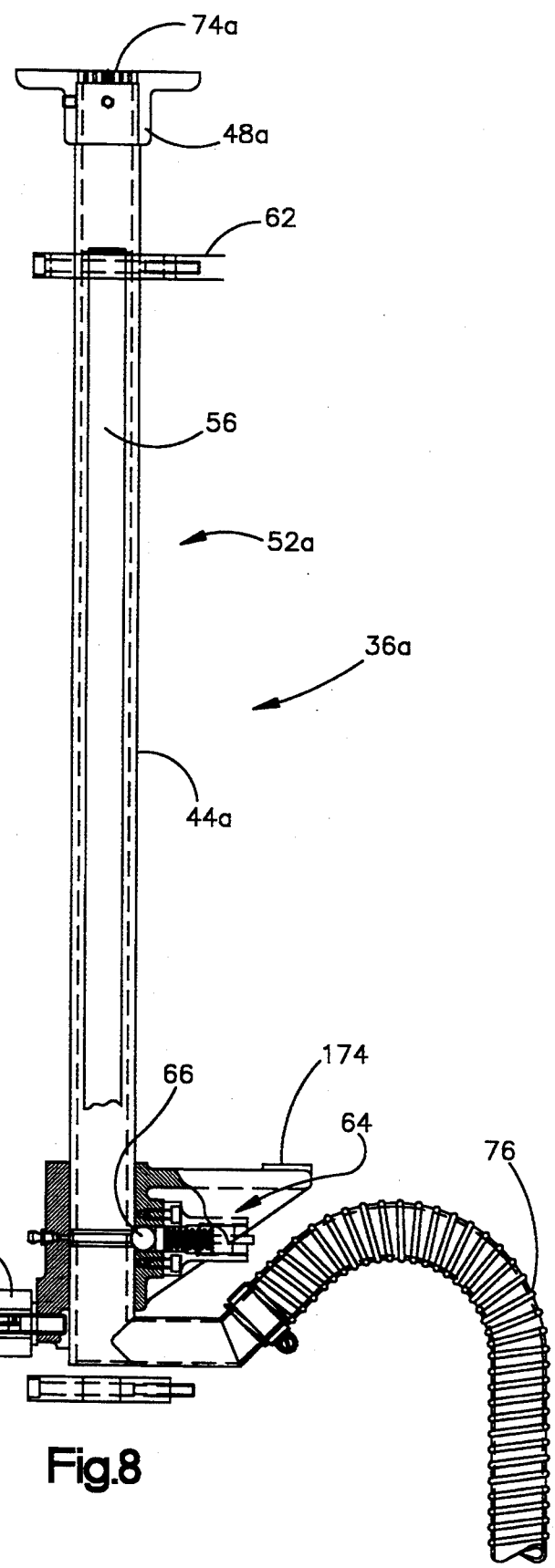
FIG. 8 is a side elevation view seen approximately from the plane indicated by the line 8—8 of FIG. 7.

Two embodiments 36a, b of the elevator mechanism are shown; the first 36a in FIGS. 7 and 8 and the second 36b in FIGS. 9 and 10. Each embodiment is for engaging a particular type of commercially available bottles different from the other in their bottom configuration. The elevator 36a of the first embodiment is for engaging a type of bottle which has a fiat bottom surface. This type of bottle typically consists of two parts; a first part for containing fluid, and a second part glued to the first part for providing a flat base for the bottle to stand on. The elevator 36b of the second embodiment is for a type of bottle having a contoured bottom consisting of three or more convex feet. This type of bottle is a one-piece construction and is fully recoverable by recycling. Contour-bottomed bottles will not be held upright by the first pedestal embodiment because they lack a flat bottom surface.

Each type of elevator includes a hollow vertical tube 44a, b having a platform 48a, b mounted thereon to form a pedestal 52a, b. The pedestals 52a, b are mounted to slide axially on a pair of guide shafts 56. Each pedestal 52a, b is mounted to a bearing block. The bearing block 58 includes two sets of slider bearings 60 which are adapted to slide freely on the pair of guide shafts 56. At the upper and lower ends of the guide shafts 56 are cross members 62. The cross members 62 are joined to portions of the carousel 32 as seen in FIG. 6. Thus, the guide shafts 56 carry the pedestals 52a and 52b and bearing blocks 58 and are fixed to the carousel 32 to rotate with it.

Referring to FIGS. 8 and 10, the bearing blocks 58 are connected to the vertical tubes 44 by ball and detent connections 64, which perform a safety function. If something obstructs the travel of any tube 44, a spring biased ball 66 mounted on the bearing blocks 58 will break out of a detent 68 formed on the tubes and the bearing blocks will be permitted to move freely relative to the tubes. Once the obstruction is removed, the ball 66 is reset in the detent 68 for normal operation. In the preferred embodiment, proximity switches are positioned to detect a pedestal tube 44 which has dropped below its normal position due to the release of a ball and detent connection 64. The proximity switches will cause the machine to shut off.

Each bearing block 58 includes a cam follower wheel 70. Each cam follower wheel 70 rests on the upper surface of an elevator cam 72 (FIG. 6) which resembles a truncated cylinder. The elevator cam 72 is shaped to cause the bearing blocks 58, and thus tile pedestals 52, to cyclically rise and fall during the rotation of the carousel 32. The path of a given pedestal 52 is illustrated in FIGS. 33a, 33b, and 33c.

Each elevator 36a of the first embodiment, shown in FIGS. 7 and 8, has openings 74a in the upper surface of its platform 48a. The openings 74a communicate with a vacuum source for holding fiat-bottomed bottles in place on the moving carousel 32. The vacuum is not necessary when operating at lower speeds. The vacuum prevents the bottles from tipping due to centrifugal force and it assures that the bottles remain in contact with the platform 48 during the downward travel.

A flexible hose 76 is connected to a conventional rotary valve 78 (FIGS. 2 and 11) to communicate a source of vacuum with tile interiors of the pedestal tubes 44a and the openings 74a. The vacuum to the hoses 76 is valved such that it is on throughout the majority of the elevator's travel, but is shut off when the elevators are unoccupied and when bottles are being transferred on and off the elevators. See FIGS. 33a, 33b, and 33c diagramming the vacuum to the elevators with respect to carousel rotation.

Referring to FIG. 11, the vacuum to the elevators 36a, b is controlled by the rotary valve 78 which is connected to the carousel axle 38. The rotary valve 78 has a rotating section 82 which has outlets 83 connected to the hoses 76 leading to the elevator mechanisms 36a or 36b. A stationary section 84 of the rotary valve 78 is connected to a vacuum source 85 and has a stationary port 86 which aligns with selected rotating outlets 83 on the rotating section 82 to communicate vacuum with selected elevators 36a or 36b at predetermined rotational positions of the carousel 32.

Each elevator 36b of the second embodiment, shown in FIGS. 9 and 10, provides a cup 88 which has an inner diameter which is slightly larger than that of the contour-bottomed bottles to be carried. The cup 88 seals around the bottom portion of the bottle 16 to hold it in place. The cup 88 moves relative to the platform 48b to permit the bottle to be moved on and off the platform 48b.

Each platform 48b is mounted on a push rod 90 which is coaxial to the tube 44b. The push rod 90 is located inside the tube 44b and slides freely with respect to the tube 44b. The lower end of each push rod 90 has a shock absorbing foot 92 which rests on a stop 94. As the follower wheel 70 moves upwardly from the position illustrated in FIG. 10, the bearing block 58, the tube 44b, and the cup 88 all move as a unit while the platform 48b and the push rod 90 remain resting on the stop 94. The platform 48b is eventually carried upward when a plastic seat 96 mounted near the top of the tube 44b engages a collar 98 fixed on the push rod. By this time, the cup 88 has sealed the bottom portion of a bottle 16. Vacuum is communicated with the interior of the tube 44b via the hose 76. A seal 100 is seated between the push rod 90 and the tube 44b at the lower end of the tube 44b. Ports 102 are formed in the upper end of the tube 44b to communicate vacuum with the interior of the cup 88. Openings 74b are formed in the platform 48b to communicate vacuum to the portion of the cup 88 above the platform 48b.

On their downward travel, the bearing block 58, the tube 44b, and the push rod 90 all move as a unit until the push rod 90 contacts the stop 94. Then, the bearing block 58, tube 44b and cup 88 continue moving downward relative to the platform 48b and push rod 90 until line position shown in FIG. 10 is reached. In the FIG. 10 position, bottles may be removed or deposited on the pedestal 52b without interference with the cup 88.

Referring to FIGS. 2, 4 and 5, the bottles 16 are removed from the carousel 32 by in output conveyor 106. The output conveyor 106 preferably consists of a downstream star-wheel conveyor which is similar to the input starwheel conveyor 30. The downstream starwheel conveyor 106 engages the bottles on the pedestals 52 and slides them across a flat surface onto the flat top conveyor 26 from which they came. Thus, the sleeving process takes place on a detour from the path of the flat belt conveyor 26.

Figures 34, 35:
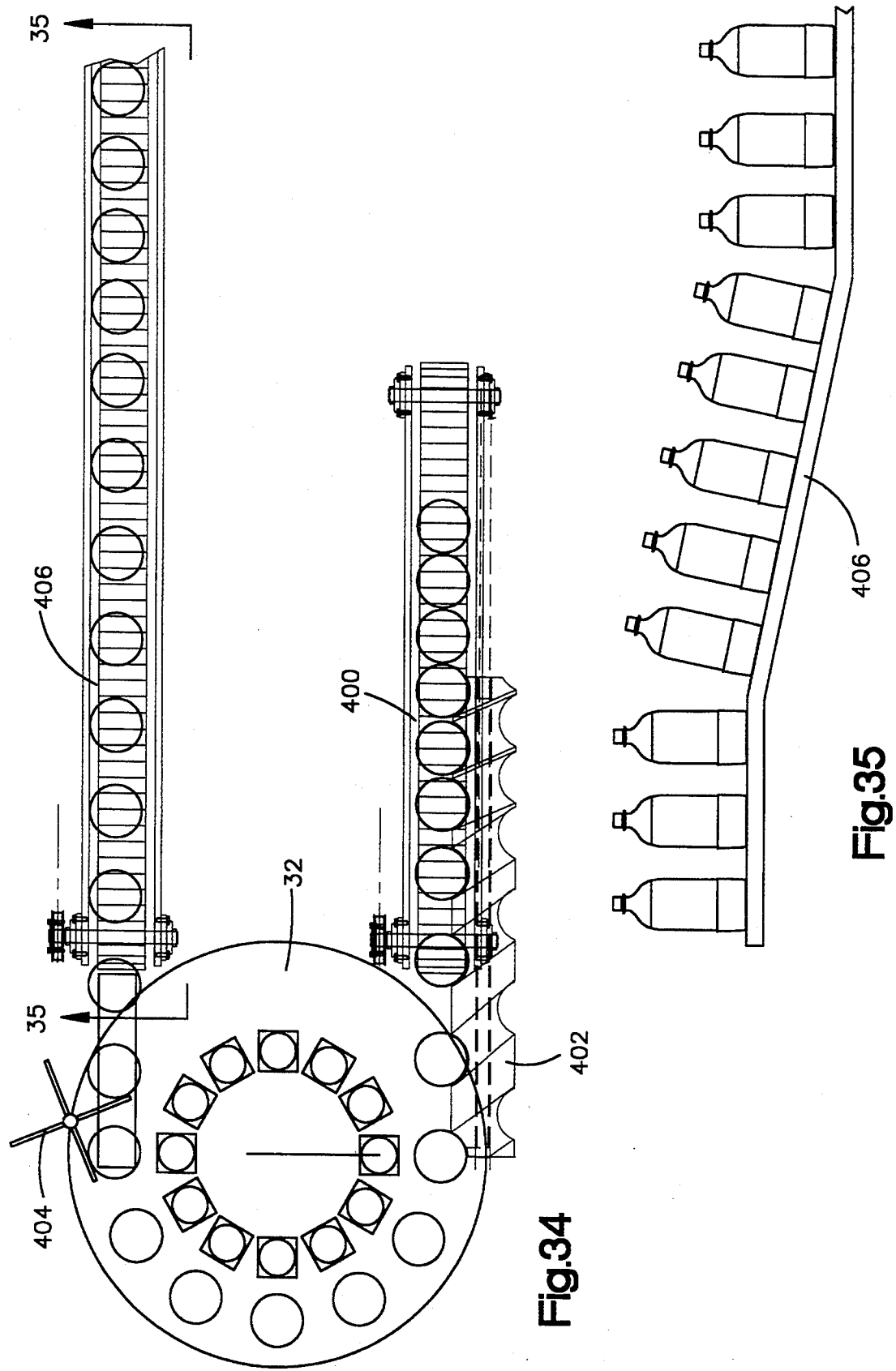
FIG. 34 is a schematic plan view of an alternate embodiment of the conveyor system.
FIG. 35 is a schematic side elevational view as seen approximately from the plane indicated by line 35—35 in FIG. 34.

Referring to FIGS. 34 and 35, an alternate U-shaped embodiment of the conveyor arrangement is shown. An input flat belt conveyor 400 and a screw shaft 402 serve to deliver bottles sequentially to the moving pedestals 52. A star wheel 404 or similar device serves to remove sleeved bottles from the opposite side of the carousel 32 and transfer them onto an output flat belt conveyor 406. The unsleeved bottles are deposited on the pedestals 52 while the pedestals are in a lowered condition as in the first embodiment. The starwheel 404 removes the sleeved bottles while the pedestals are still in their raised condition after elevating the bottles into the sleeves. Thus, the output flat belt conveyor 406 is, at least at its upstream end, higher than the input flat belt conveyor 400. This arrangement is believed to permit higher operating speeds when filled bottles are being sleeved because the relatively heavy filled bottles do not have to be lowered before they are removed from the carousel. Lowering filled bottles at high speeds can present problems due to the bottles inertia which resists the rapid downward pull of the pedestals. Thus, in this embodiment, the pedestals 52 are unoccupied when lowered.

SLEEVING STATIONS

Figure 12:
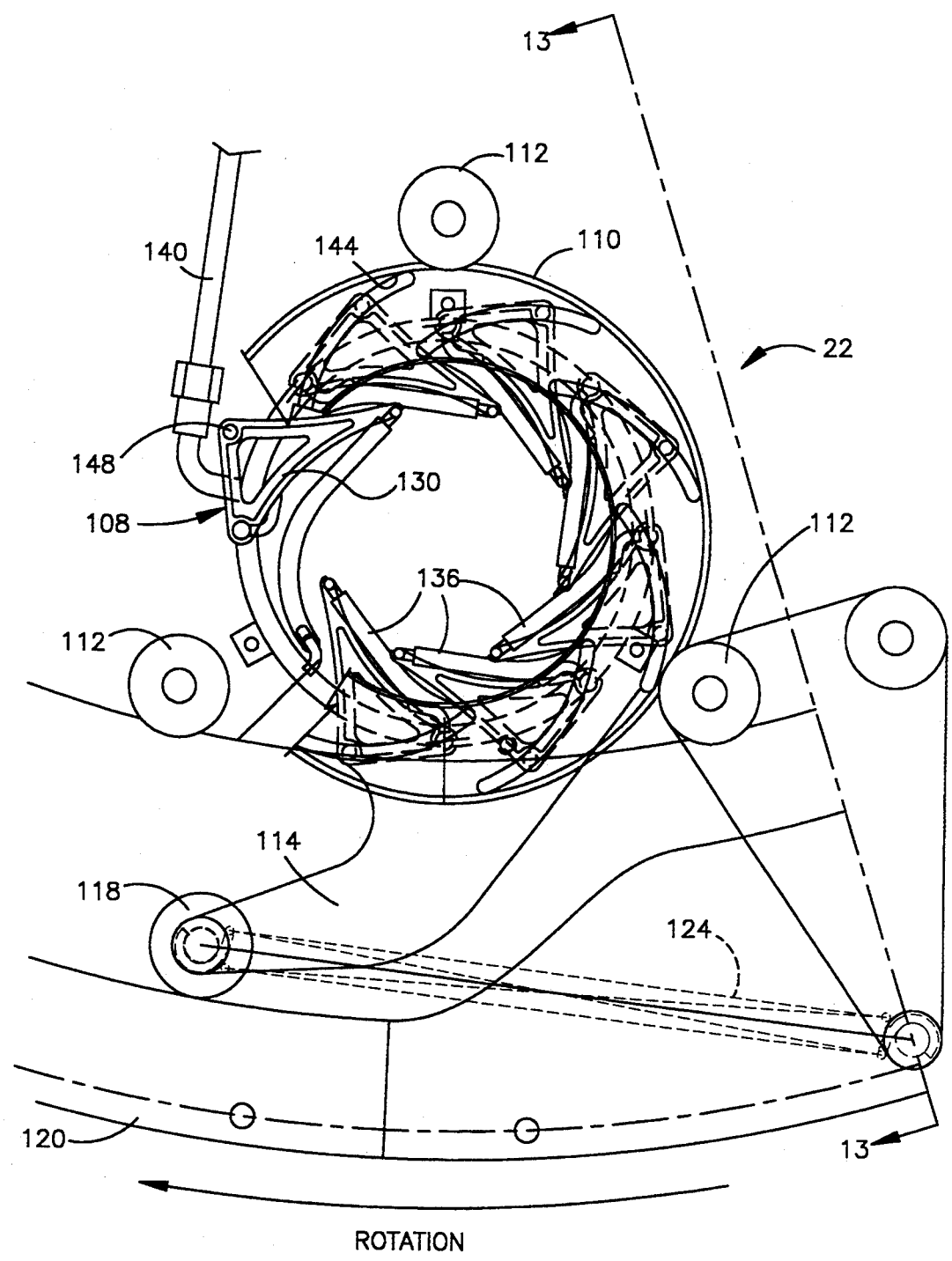
FIG. 12 is a plan view of one labeling station of the machine.
Figure 13:
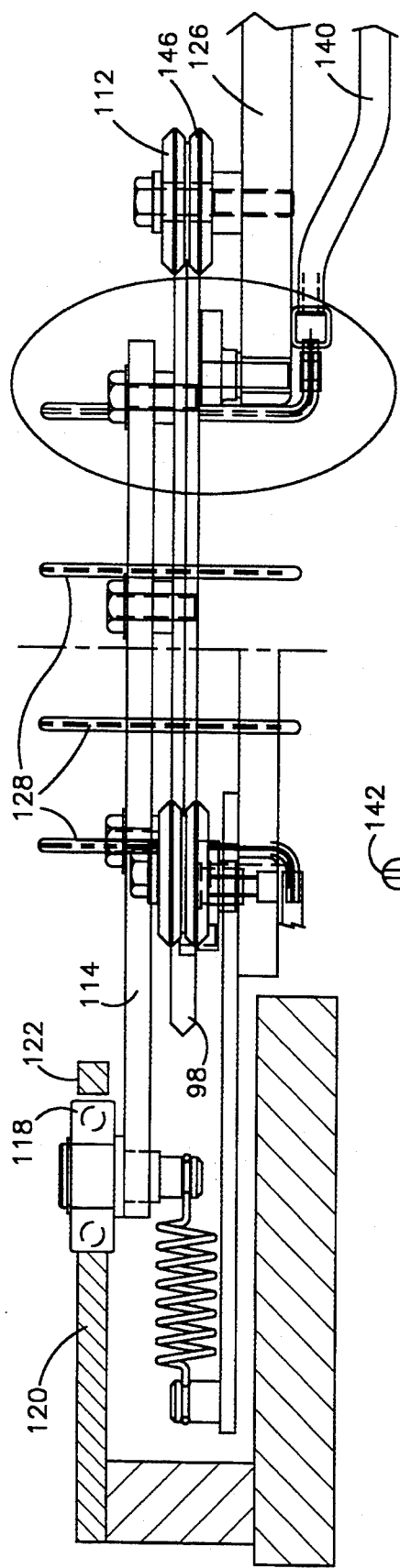
FIG. 13 is a fragmentary sectional view as seen approximately in the direction of the plane indicated by the line 13—13 of FIG. 12.
Figure 14:
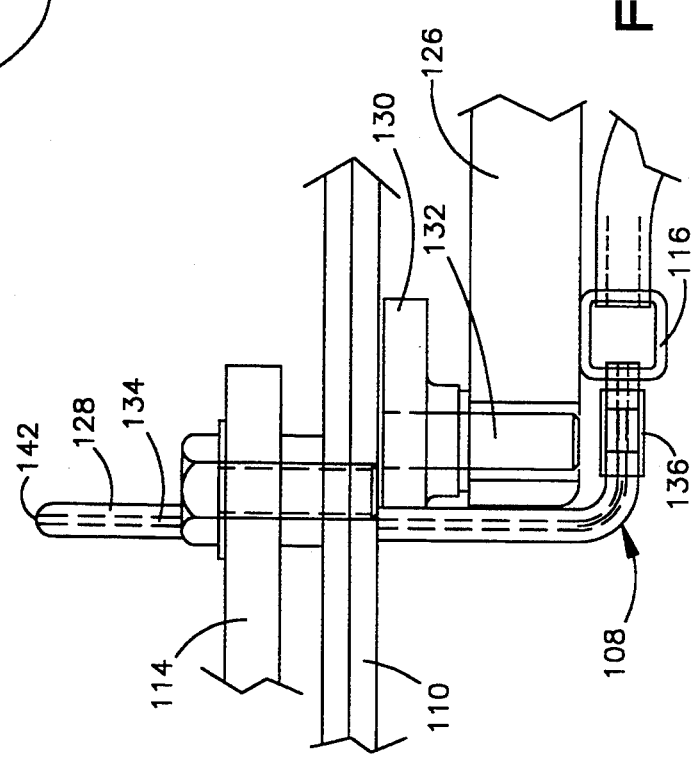
FIG. 14 is an enlargement of the window of FIG. 13.

The set of sleeving stations 22 are located on the carousel 32 in a circular pattern as illustrated in FIG. 4. Each sleeving station 22 is aligned with an associated elevator platform 48 such that bottles 16 may be passed through the centers of the sleeving stations 22 by the elevators 36. The bottles are inserted into a waiting sleeve when they pass upwardly through the stations 22. The sleeving stations 22 are identical, thus, only one will be described. Referring to FIGS. 12-14, each sleeving station 22 comprises a plurality of pin structures 108, a actuator ring 110, three actuator ring support wheels 112, a follower arm 114, and a plenum ring 116. The follower arm 114 includes a roller 118 for engaging an outer circular cam 120 and an inner circular cam 122. The follower arm 114 is spring biased outwardly, or counterclockwise as viewed in FIG. 12, with a spring 124 connected to the carousel 32. The follower arm 114 rotates the ring 110 to cause the pin structures 108 to pivot inward and outward in accordance with a predetermined cycle as illustrated in FIGS. 33.

Figure 15:
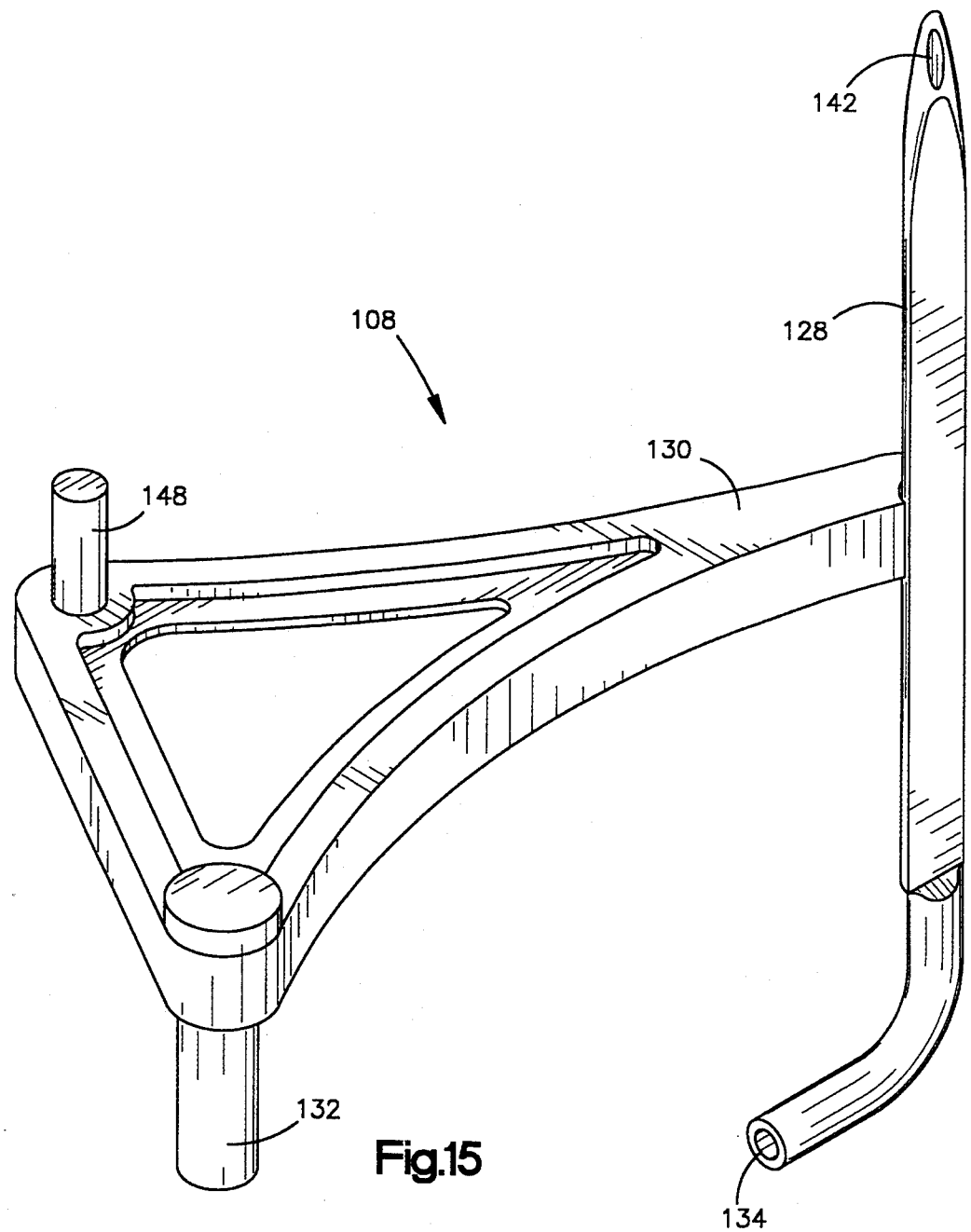
FIG. 15 is an enlarged perspective view of the pin and associated pivot arm of the labeling station.

Referring to FIGS. 14 and 15, each pin structure 108 is pivotally mounted on an upper plate 126 of the carousel 32 such that a linear finger portion 128 of each pin structure 108 is substantially parallel to the finger portions 128 of the other pin structures 108. A proximal end of each finger portion 128 is attached to an associated pivot arm 130. Each pivot arm 130 includes a pivot shaft 132 operable to pivot the pin structure 108 about an axis normal to the plane of the upper plate 126.

Each finger portion 128 is hollow to provide an air passage 134. The air passage 134 of each pin 108 is connected to the hollow plenum ring 116 by a flexible tube 136. The plenum ring 116 is joined to a rotary air valve 138 (FIG. 16) by a conduit 140. When the plenum 116 is pressurized, air streams from an outlet 142 in the distal end of the finger portions 128 to provide the lubricating gas film between the sleeve 20 and the object being sleeved. The outlet 142 is formed to direct gas toward the object being sleeved. The distal end of the finger portion 128 is tapered.

The pivot action of the pivot arms 130 allows a great space-saving advantage. The pivot arms 130 permit a relatively long arc of motion by the pins 108 while taking up a relatively compact space. The production rate of the machine for a given carousel diameter moving at a given speed is determined by the number of sleeving stations 22 arranged about the carousel 32. The compact pin-moving mechanisms of the present apparatus permit a large number of sleeving stations 22 to be placed around a given sized carousel 32 and thus permit a greater production rate.

As shown in FIG. 12, the ring 110 has a plurality of slots 144 formed therein corresponding to the number of pins 108 and pivot arms 130. The ring 110 is supported by the ring support wheels 112. Each wheel 112 has a V-shaped groove 146 formed therein for engaging the actuator ring 110 (FIG. 13). At least one of the actuator ring support wheels 112 is laterally adjustable to facilitate adjustment and removal of the ring 110. A projection 148 on each of the pivot arms 130, as seen in FIG. 15, engages an associated one of the slots 144 cut in the ring 110. The slots 144 are cut in a spiral shape such that rotation of the ring 110 causes inward or outward movement of the pivot arms 130 and corresponding pins 108 depending on the direction of actuator ring rotation. In other words, the projections 148 fit within the slots 144 and are forced to follow the direction of the slots 144 as the ring 110 is rotated.

As viewed in FIG. 12, clockwise rotation of the ring 110 urges the pins 108 inward toward the center axis of the sleeving station 22 to permit the finger portions 128 to receive a sleeve from the transporter 24. Counterclockwise rotation of the ring 110 causes the pins 108 to expand to stretch a sleeve.

Referring to FIG. 4, the followers 114 engage the circular cams 120,122 to rotate the rings 110. The cams are disposed radially outwardly of the carousel 32. The outer cam 120 is constructed of a plurality of sections, any of which may be replaced with a different shaped section to alter the operating characteristics of the actuator rings 110 and the pins 108. For example, it is usually desirable to change the distance the pins are moved to accommodate smaller bottles and smaller sleeves. The outer circular cam 120 is provided to urge the ring follower arm 114 inward at a predetermined time. The spring 124 urges the follower arm 114 to rotate the ring 1.10 against the tension of a sleeve stretched around the pins 108. If the spring force is insufficient to completely stretch a sleeve, which may occur when using thick sleeves, the inner cam 122 will operate to urge the follower 114 to its outermost extent to positively stretch a sleeve 20.

Figure 16:
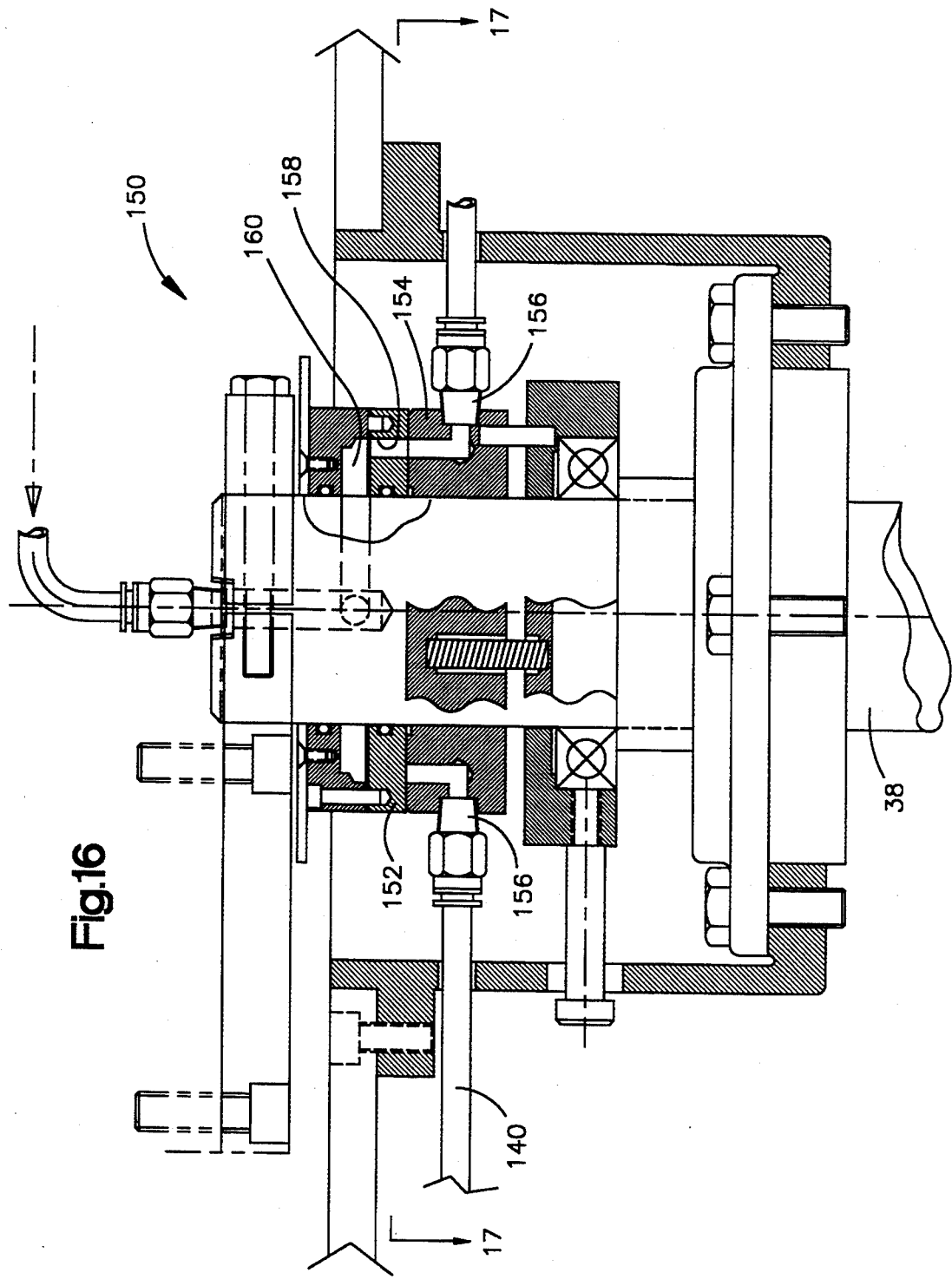
FIG. 16 is a fragmentary cross sectional view of the rotary valve controlling the compressed gas for the labeling stations.
Figure 17:
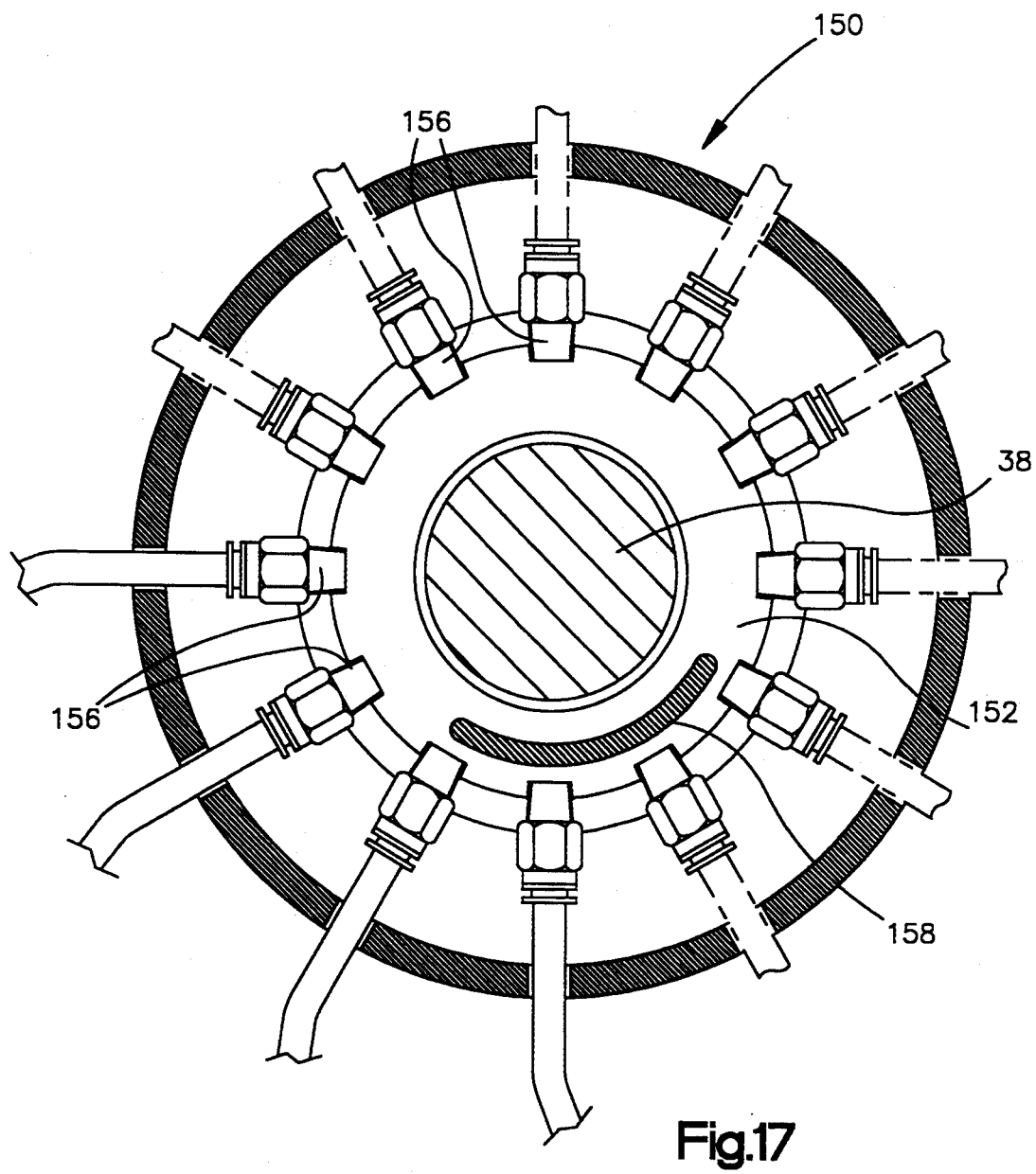
FIG. 17 is a somewhat schematic sectional view seen approximately from the plane indicated by the line 17—17 of FIG. 16.
Figure 20:
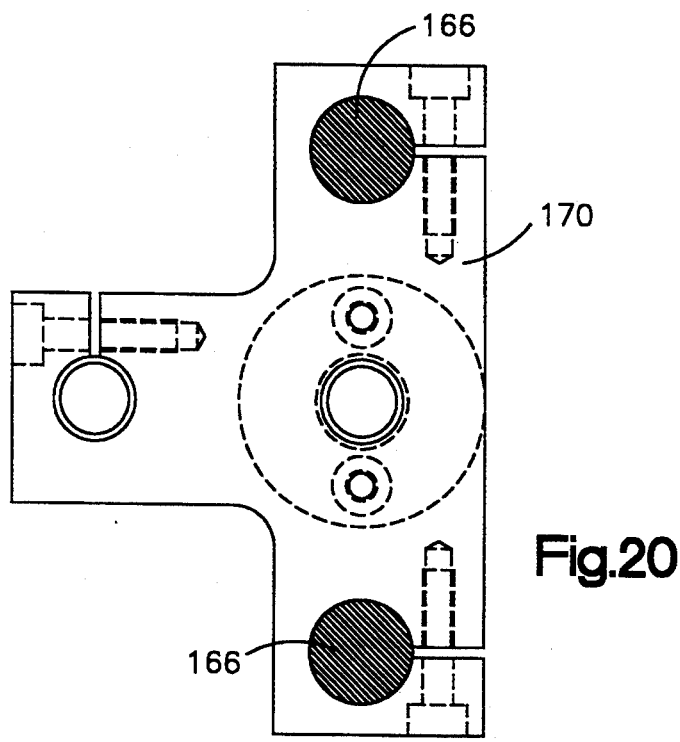
FIG. 20 is a sectional view seen approximately from the plane indicated by the line 20—20 of FIG. 18.
Figure 21:
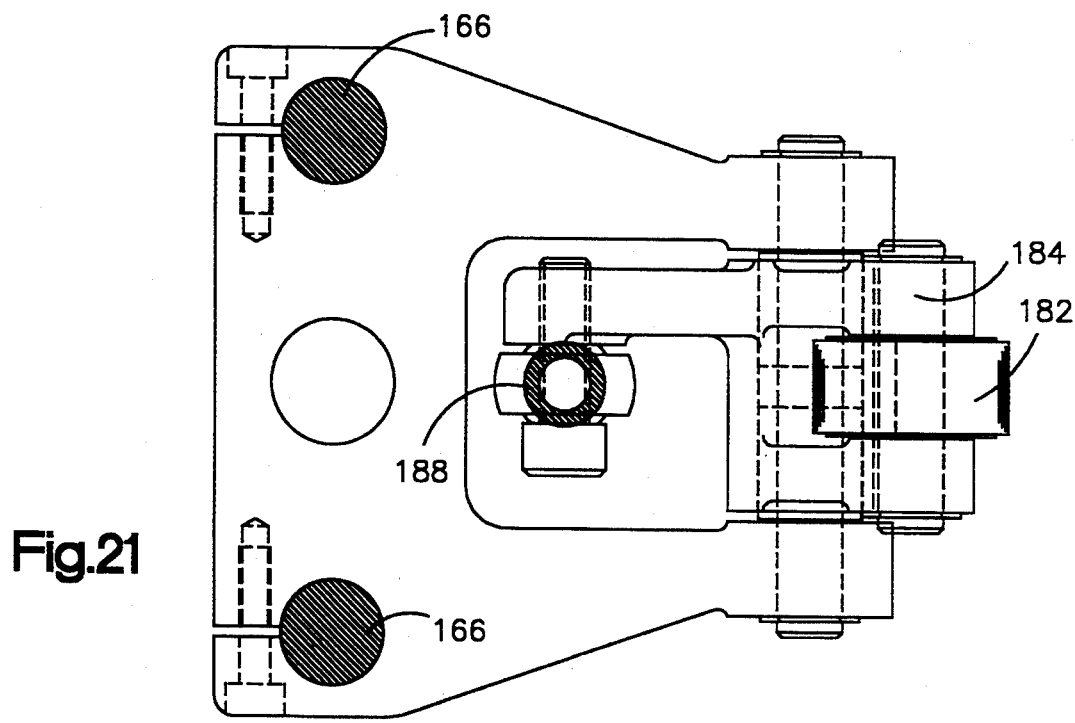
FIG. 21 is a sectional view seen approximately from the plane indicated by the line 21—21 of FIG. 18.

Referring to FIGS. 16 and 17, a rotary valve 150 is provided for distributing compressed air to the sleeving stations 22 at predetermined times. The rotary valve 150 is similar to that described previously with respect to the elevators 36. The rotary valve 150 is mounted on the axle 38 of the carousel 32. The valve 150 includes a stationary section 152 and a rotating section 154. The rotating section 1.54 includes a plurality of outlets 156 connected to the conduits 140. The stationary section 152 includes a shaped port 158 which communicates with a space 160 which is continuously pressurized by a compressed air pump 161. The shaped port 158 is aligned with selected outlets 156 depending on the rotational position of the carousel 32. Compressed gas is supplied to the plenum rings 116 by the rotary valve 150 during the time that a bottle 16 is entering a stretched sleeve 20 as indicated in FIGS. 33a, b, and c. The gas film lubrication provided by the pins serves to reduce the friction between the sleeve and the bottle. By reducing the effects of friction on the sleeves, a greater degree of flexibility in choosing sleeve characteristics is achieved.

SLEEVE POSITIONING GRIPPERS

Referring to FIGS. 18, 19, 20 and 21, each sleeving station 22 in the preferred embodiment includes a pair of grippers 162 for positively ensuring that the sleeves do not move with respect to the bottle once properly positioned thereon. Each pair of grippers 162 are shaped to fit a bottle 16 and each gripper 162 has a resilient pad 164 on its gripping surface. As shown in FIG. 33, the grippers clamp against bottles and their associated sleeve and move vertically therewith for a portion of the sleeving cycle. The grippers 162 release the bottles before they pass downward through the sleeving stations 22 after being sleeved.

Referring to FIG. 18, each pair of grippers 162 are mounted on two vertical guide bars 166 which slide freely with respect to the carousel 32. Lifter rods 168 are connected to the guide bars 166 by at least one bracket 170. At its lower end, each lifter rod 168 has a shock absorbing foot 172. Each foot 172 is, at times, engaged by a platform 174 of the bearing block 58 (FIGS. 9 and 10). Thus, each lifter rod 168 rises and falls with its associated elevator 36 during a portion of the cycle. The lifter rods 168 do not track the vertical movement of the elevators 36 throughout their cycle. The platforms 174 are not always in engagement with the feet 172. As illustrated in FIG. 33, the lifter rods 168 and the grippers 162 are moved upwardly by the platforms 174 only when the bottles are inside the sleeving stations 22. Limit stops 176 prevent the gripper guide bars 166 and the lifter rods 168 from following the platforms 174 downward beyond a predetermined point.

Gripper cams 178 and associated linkages 180 operate to open and close the grippers 162 at predetermined times. The gripper cams 178 are mounted to the carousel 32 and are vertically adjustable. Cam followers 182 and associated lower bell cranks 184 are mounted to the guide bars 166 with brackets 186. When the cam followers 182 are driven along the cams 178 by the rising platforms 174, push rods 188 are moved axially by the bell cranks 184 connected to the followers 182.

The axial movement of each of the push rods 188 is translated to horizontal movement by upper bell cranks 190. One arm of each upper bell crank 190 is connected to an associated push rod 188. The other arm of each upper bell crank 190 is connected to a pair of adjustable links 192. Each of the adjustable links 192 is connected at its opposite end to a portion of an associated gripper arm 194. Each of the gripper arms 194 is pivoted about a pivot joint 196 for opening and closing motion. The distance between the gripping pads 164 of each of the gripper arms 194 may be adjusted by rotating turnbuckles 198 on the adjustable links 192. A spring 199 is stretched between posts on each pair of gripper arms 194. Each spring 199 urges the followers 182 against their respective cams 178.

Thus, movement of the cam followers 182 is translated to opening or closing movement of the associated gripper arms 194. The vertical location of the cams 178 determines the time at which the associated grippers 162 are opened and closed. The position of the push rods 188 with respect to the platforms 174 determines the time in the cycle at which the gripper arms 194 begin to move upwardly with an associated elevator 36.

SLEEVE TRANSPORTER

Figure 22:
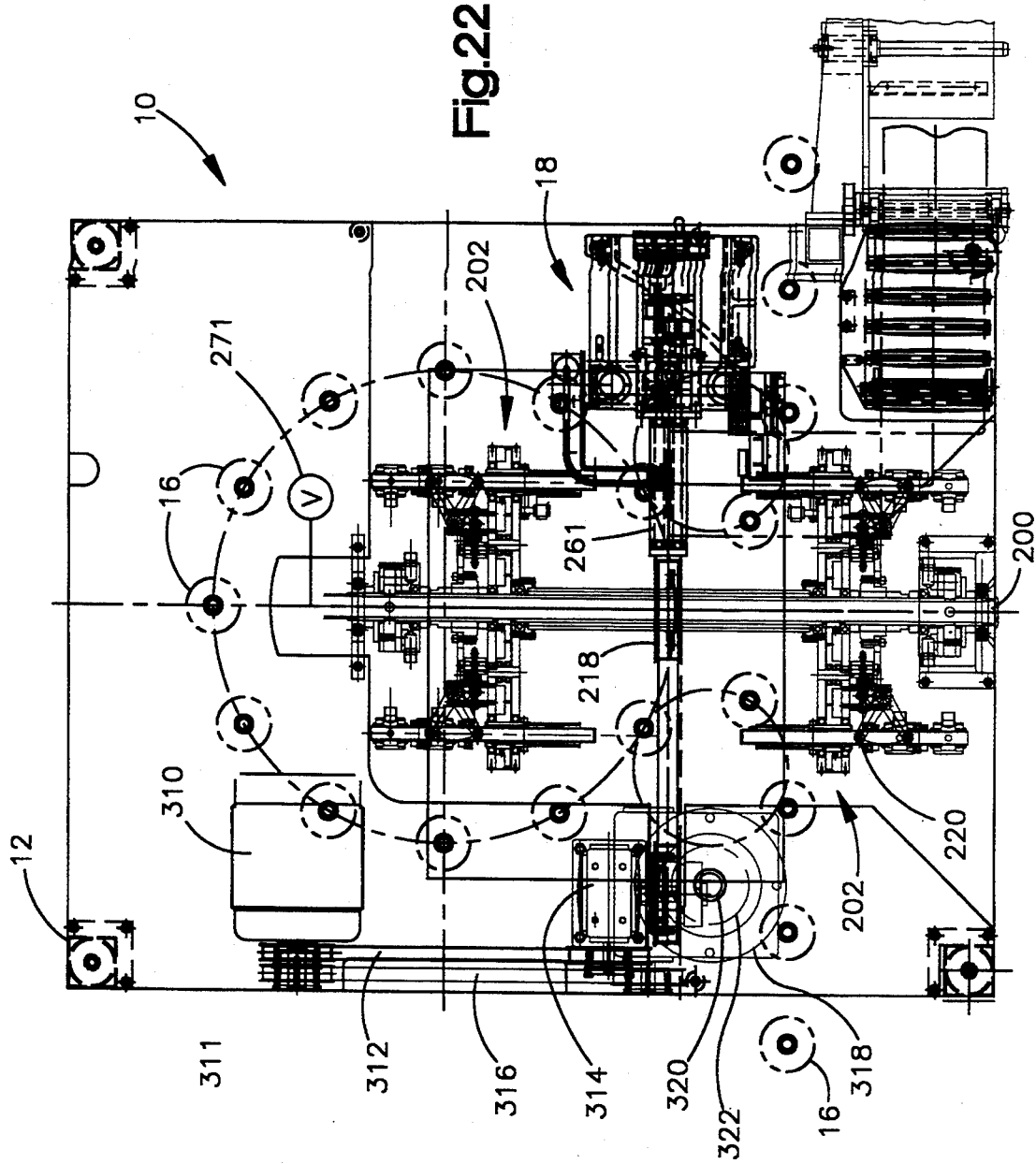
FIG. 22 is a plan view of selected parts of the machine.
Figure 23:
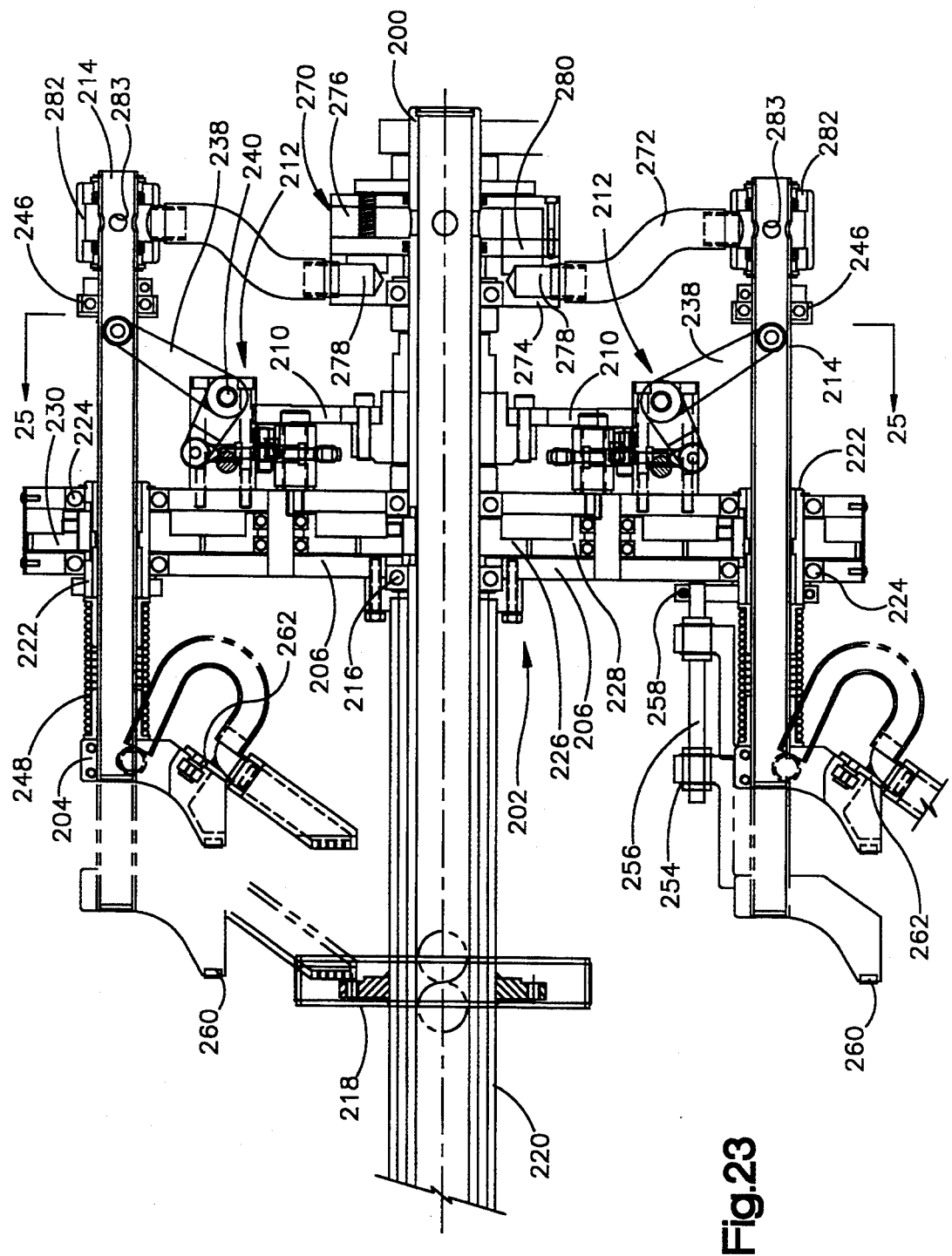
FIG. 23 is a sectional view of the label transporter carriage as seen approximately from the direction normal to a plane bisecting the transporter.

Referring to FIGS. 6, 22, and 23, the sleeve transporter 24 separates individual sleeves from a web 199 and delivers them to the sleeving stations 22. The sleeve transporter 24 comprises a transporter support shaft 200, and two synchronously rotatable carriages 202 mounted thereon. Each carriage 202 supports a plurality of circularly arranged tool heads 204 which form pairs with corresponding identical tool heads 204 on the other carriage 202. Each tool head 204 is mounted to move axially such that the two opposed tool heads 204 forming the pairs may come together to grip a sleeve 20 or move apart to open a sleeve 20 at the appropriate times.

The carriages 202 are mirror images of each other, therefore, only one will be described. Referring to FIG. 23, each carriage 202 comprises a frame 206, a planetary gear set 208, a tool-actuating cam 210 and linkage 212, and a tool support shaft 214. The carriages 202 are rotatably mounted a predetermined distance apart on the transporter support shaft 200. The carriage frame 206 is rotatably mounted on the transporter support shaft 200 by a hub bearing 216. The frames 206 are synchronously rotated about the shaft 200 by a timing pulley 218. The timing pulley 218 is timed to rotate the transporter 24 in a predetermined relationship to the position of the carousel conveyor 32. The timing pulley 218 is fixed to a drive sleeve 220 which surrounds the non-rotating support shaft 200 and is attached to the carriage frames 206.

Circularly arranged around each carriage frame 206 are a plurality of bushing blocks 222. The bushing blocks 222 are located between the tool support shafts 214 and the frame 206 and are mounted on the frame 206 with roller bearings 224. The bushing blocks 222 permit the tool support shafts 214 to both rotate and slide axially with respect to the frame 206. The planetary gear set 208 rotates the tool support shafts 214 to keep the tool heads 204 oriented in one direction as the transporter 24 rotates.

Figure 24:
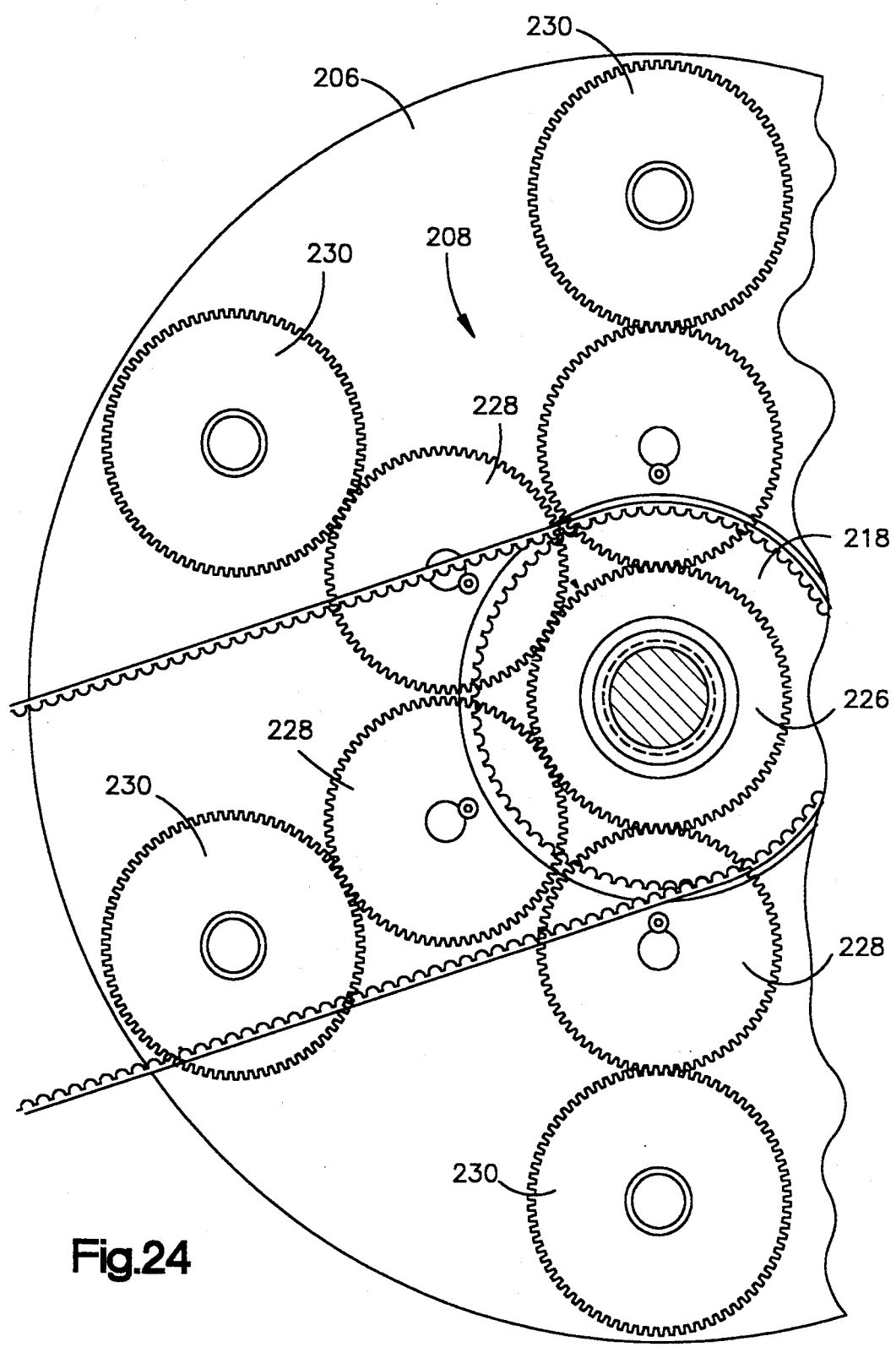
FIG. 24 is a schematic elevation view of the planetary gear set of the transporter.

Referring to FIG. 24, a spur-type sun gear 226 is fixed to the non-rotating transporter support shaft 200. A plurality of intermediate spur gears 228 are rotatably mounted on the frame 206 between the bushing blocks 222 and the sun gear 226. Engaged to each of the intermediate gears 228 is an outer spur gear 230. Each outer gear 230 is keyed to an associated bushing block 222 to rotate therewith.

The sun gear 226 and all the outer gears 230 have the same number of teeth. Thus, as the transporter 24 rotates, the intermediate gears 228 are driven by virtue of their engagement with the stationary sun gear 226. The intermediate gears 228 in turn drive the outer gears 230 which are keyed to the bushing blocks 222. Since the planetary gear ratio is 1:1, one rotation of the transporter 24 causes each tool support shaft 214 to be synchronously driven one rotation in the opposite direction. The planetary gear set 208 permits the tool heads 204 to orbit the transporter support shaft 200 while always maintaining the same orientation in relation to the machine.

Figure 25:
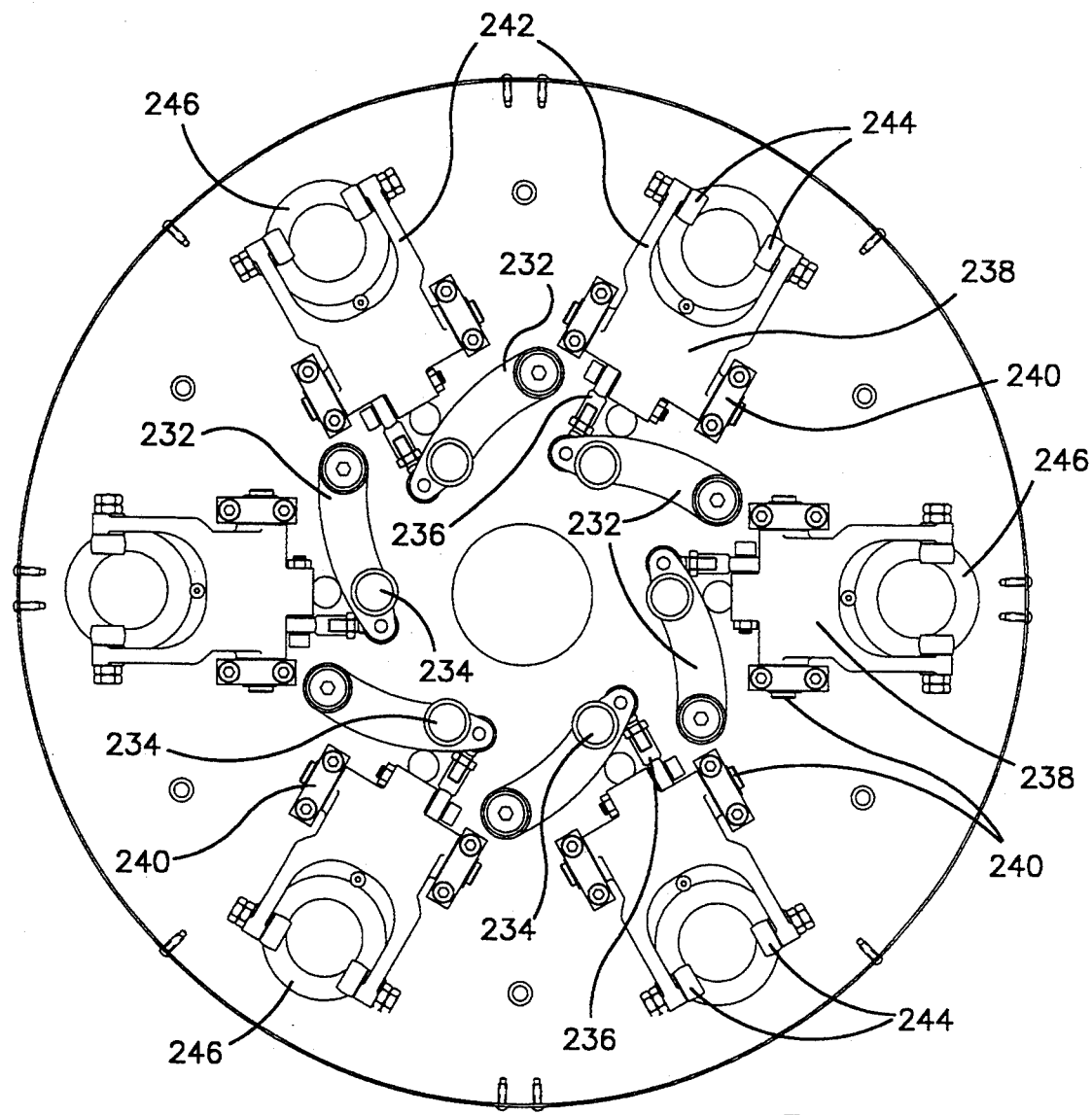
FIG. 25 is a side elevation view as seen approximately from the plane indicated by the line 25—25 of FIG. 23.

Referring to FIGS. 23 and 25, the tool-actuating cam 210 and linkage 212 are provided to move the tool support shafts 214 axially at predetermined times during the rotation of the transporter 24. Each tool-actuating cam 210 is fixed to the transporter support shaft 200. The cam 210 is mounted on the shaft 200 with a commercially available device known as a TRAINTORQUE (trademark) coupler manufactured by Manheim Manufacturing and Belting Co. which permits adjustments of the cam's position in relation to the shaft 200 for timing purposes.

As best shown in FIG. 25, a plurality of cam follower arms 232 are pivotally connected to the frame 206. Each arm 232 includes a cam follower roller 234. At the distal end of each arm 232, an adjustable link 236 is provided. Each link 236, seen in FIG. 25 transmits motion of the cam 210 to an associated bell crank 238. Each bell crank 238 is pivoted about a pivot joint 240. The other arm of each bell crank 238 forms a yoke 242 which has two rollers 244 at its distal ends. The rollers 244 each engage a rotatable collar 246 on the associated tool support shaft 214. The yoke 242 does not interfere with the rotation of the tool support shafts 214. This linkage transmits motion of the cam follower 234 into axial movement of the tool support shafts 214.

Referring to FIG. 23, the tool support shafts 214 are axially biased by springs 248 such that each cam follower 234 (FIG. 25) is continuously urged against the tool-actuating cam 210. The lengths of the links 236 are adjustable to vary the positions of the bell cranks 238, and the positions of the tool support shafts 214. Thus, the axial positions of the tool support shafts 214 are determined by the shape of the tool-actuating cam 210.

Each tool head 204 is fixed to the end of its associated tool support shaft 214 as seen in FIG. 23. The tool heads 204 each have a gripping element 250 for gripping and tearing off a sleeve from the web 199 and a pair of vacuum tips 252 for carrying a sleeve to the sleeving station 22 and for opening a sleeve. Each tool head 204 includes a slider bearing 254 for sliding on an associated fixed guide rod 256. The guide rods 256 are fixed to brackets 258 which are fixed to an associated busing block 222.

Referring to FIGS. 26 and 27, each gripping element 250 is formed of a resilient pad 260 fitted to the face of the tool head 204. The gripping element 250 cooperates with the identical corresponding part on the other carriage to grip and separate a sleeve 20 from the web 199. The gripping occurs as two opposed support shafts 214 are axially extended by the cam 210 and associated linkage 212 to bring the tool heads 204 towards one another. The tearing action which separates a sleeve from the web 199 is due to the rotation of the transporter 24. Powered nip rolls 261 hold the web 199 above the lowermost line of weakness such that a terminal sleeve is free to be separated.

Each pair of vacuum tips 252 serves to pull open a separated sleeve 20 into a box-shape to fit around the pins of one of the sleeving stations. See FIG. 33a. Each set of vacuum tips 252 is connected to an associated bracket 258 which is slidably fitted into a t-slot 264 formed in the associated tool head 204. See FIGS. 23 and 26. The distance between the vacuum tips 252 of each pair may be varied for different sized sleeves by loosening a fastener, sliding the bracket 262 along the t-slot 264, and re-tightening the fastener.

Referring to FIG. 29, each vacuum tip 252 has a plurality of holes 266 formed in its sleeve-engaging face 268. These holes 266 communicate with the vacuum source during predetermined times as discussed above. The holes 266 are arrayed such that a screen is formed to prevent the sleeve wall from entering the vacuum tip 252.

As shown in FIG. 33, each sleeve 20 is separated from the web 199 at the sleeve supply station 18 and transported to the sleeving station 22. As a sleeve is transported between the sleeve supply station 18 and the sleeving station 22, the pair of tool heads 204 holding the sleeve move apart in response to the axial movement of the tool support shafts 214 and the sleeve is rapidly opened to form a box shape. The box-shaped sleeve may easily be placed over a set of pins 108 as seen in FIG. 33a.

Once the sleeve is around the aligned set of pins 108, the pins 108 are expanded to hold the sleeve and the vacuum is shut off from the vacuum tips 252 to release the sleeve. The sleeves are sequentially placed around the sets of pins 108 as the sets sequentially pass by the transporter 24 and as the transporter 24 is rotating. The transporter 24 is rotated in predetermined relation to the carousel such that a sleeving stations 22 register with pairs of opposed tool heads 204 as the machine operates.

The sleeve transporter 24 includes a rotary vacuum valve 270 for supplying vacuum from a vacuum source 271 to the vacuum tips 252. The transporter support shaft 200 is hollow and communicates with the vacuum pump. The interior of the tool support shafts 214 are also hollow and communicate with the interior of the transporter support shaft 200 via the rotary valve.

The rotary valve 270 controls the vacuum to shut it off and turn it on at appropriate times during the transporter 24 rotation. The rotary valve 270 communicates selected ones of a plurality of flexible hoses 272 with the interior of the transporter support shaft 200 at predetermined times. The rotary valve 270 includes a rotating section 274 and a stationary section 276. In a well-known manner, alignment between rotating ports 278 communicating with tool support shafts 214 and a stationary port 280 communicating with the vacuum source occurs only during a predetermined portion of the rotary valve's rotation to achieve the desired timing valve effect. It is desirable to have the vacuum communicated with the vacuum tips 252 only when a sleeve is being transported which is about one quarter of a given tool head's orbit.

The moving portion of the rotary valve 270 is preferably driven by a rigid link (not shown) located between the frame 206 and the moving section 274. However, the hoses 272, being connected to the rotating transporter, may operate alone to drive the rotary valve 270.

The flexible hoses 272 serve to communicate the rotary valve 270 with a rotary coupling 282. The rotary coupling 282 is rotatably mounted on the tool support shaft 214 and is sealed against air leakage from the atmosphere. A plurality of holes 283 are formed in the tool support shaft 214 to communicate vacuum from inside the coupling to the interior of the rotating tool support shaft 214.

SLEEVE SUPPLY STATION

Figure 32:
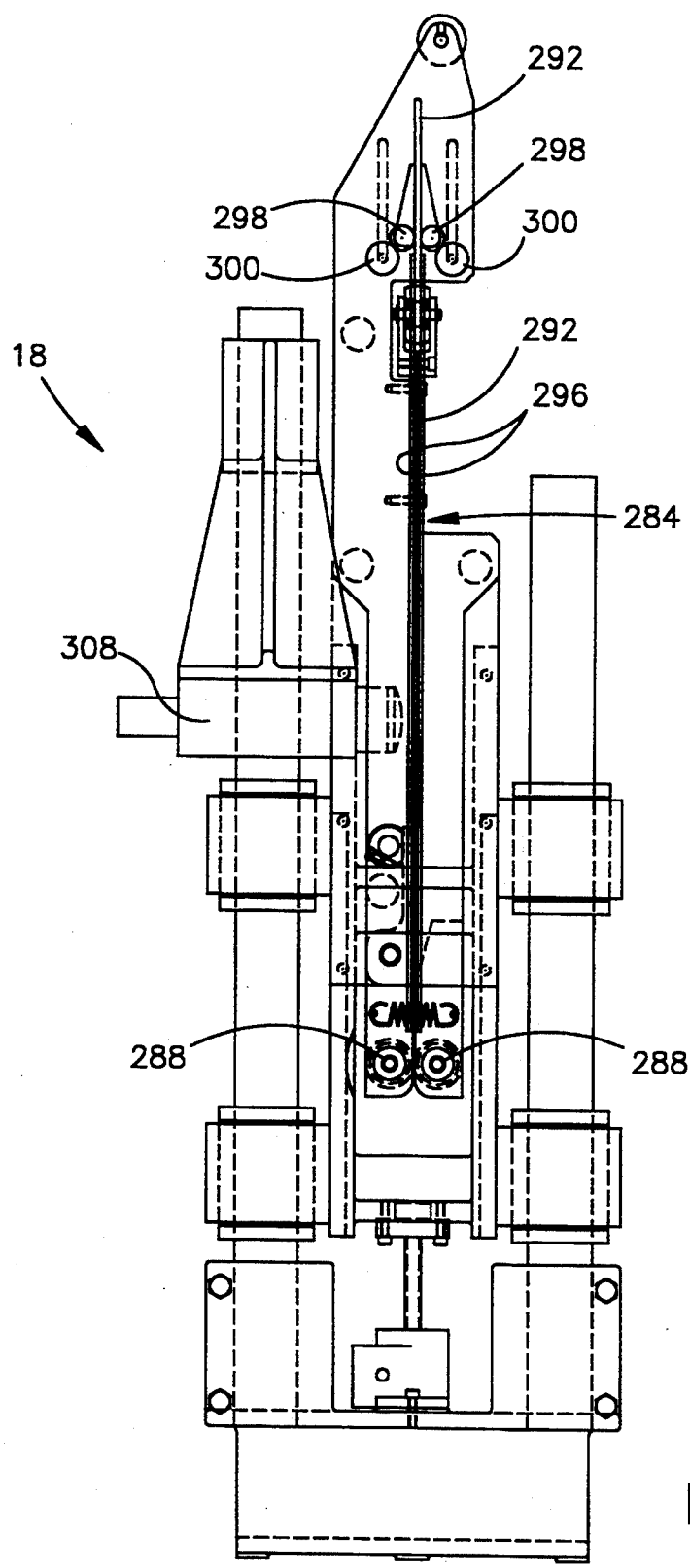
FIG. 32 is a side elevation view as seen approximately from the plane indicated the line 32—32 of FIG. 30.

The sleeve supply station 18, as seen in FIGS. 11, 30 and 32, provides a supply of sleeves 20 to the sleeve transporter 24 for eventual placement on bottles 16. This station 18 includes a guide apparatus 284 for imparting folds along the sleeves and a pair of powered nip rollers 261 for pulling the sleeves through the station 18. The sleeves enter the station 18 as the tube or continuous web 199 of sleeves joined by lines of weakness which are preferably lines of perforations. The sleeve web 199 passes around a center guide 292 and between two upper nip roller pairs such that the center guide 292 is entirely inside the walls of the tubular web 199.

The center guide 292 comprises two parallel spaced guide plates 296 fixed to two upper rollers 298. The center guide is supported solely by the upper rollers 298 resting on outer support rollers 300 mounted on frame members 302 of the station 18. The wall of the tubular web 1.99 passes between each outer support roller 300 and a cooperating upper roller 298. Thus, the center guide 292 hangs within the supply station 18 by the upper rollers 298 and is positioned inside the web 199.

Two opposed angular guide plates 304 extend inwardly from the frame members 302. The angular guide plates 304 fit loosely between the spaced guide plates 296 of the center guide 292. The angular guide plates 304 form a tapered path for the web 199 in the downstream direction. As shown schematically in FIG. 31, the sleeve web passes between the spaced guide plates 296 and the angular guide plates 304. As the web 199 travels downward through the station 18, the angular guide plates 304 force the web 199 deeper between the spaced guide plates 296. This action forms folds 305 in opposite sides of the web 199.

At the downstream end of the supply station 18 is the pair of driven nip rollers 261. The nip rollers 261 pull the web 199 down through the supply station LB. A motor 306 driving the nip rollers 261 is controlled by an automated registering system. The registering system senses invisible markings on the web 199 with a detector 308 and moves the web 199 according to their position. The motor 306 runs continuously aligning sleeves on the web 199 in the correct position fully below the nip rollers 261 by responding to the registration control system. The automated registering system is similar to that disclosed in the referenced U.S. Pat. Nos. 4,392,056; 4,467,207; 4,680,205; 4,926,048; and 4,945,252 for web registration systems which are hereby incorporated by reference.

The folds 305 in the web 199 permit very high speeds to be achieved by the transporter 24, and thus the sleeving machine 10 as a whole. The result of the folds 305 is that each sleeve 20 is ready to pop open when pulled open by the transporter. The special folds 305 facilitate rapid opening by permitting rapid air entry into the sleeve.

DRIVE SYSTEM

Referring to FIG. 22, the machine is powered by a single motor 310 which drives all parts of the sleeving machine 10 except for the nip rollers 261. Two timing belts 312, 316 extend from a pulley 311 on the motor 310. The first timing belt 312 drives a first gear box 314 which drives the transporter pulley 218. The second timing belt 316 drives a second gear box 318 which drives a vertical shaft 320. The vertical shaft 320 drives all machine functions except the sleeve transporter 24 and the web supply station 18. The pinion gear 322 engages infeed starwheel gear 326 which engages gear 324 (attached to carousel 32) which engages outfeed starwheel gear 330 (all kept in time by their engagement). At several locations throughout the drive system, TRANTORQUE couplings are used to mount components to their shafts to permit precision timing adjustments to be made between the component and its shaft.

In the preferred embodiment, a digital encoder is placed on shaft 320 to provide the automated registering system with a digital signal representing the rotational position of the machine. Preferably, one revolution of the shaft 320 corresponds to one labeling cycle of the machine.

METHOD OF SLEEVING

Referring to FIG. 33, the sleeving method comprises a repeating 360° cycle. FIG. 33 follows one sleeving station 22 around one sleeving cycle, however, in the preferred and illustrated embodiment, multiple sleeving stations 22 operate to simultaneously perform the steps shown in FIGS. 33, each sleeving station 22 leading or trailing the progress of adjacent stations.

Following one sleeving station 22, at the point designated as 0° in FIG. 33a, the pins 108 are contracted as a restilt of the actuator ring follower arm 114 being urged inwardly by the outer cam 120. Here, a sleeve 20 is placed around the pins 108 by the vacuum tips 252 of the sleeve transporter 24. The pins 108 are then expanded to stretch and frictionally hold the sleeve 20 on its inside surface. The tension of the spring 124 urging the ring follower arm 114 outward may be insufficient to fully stretch the sleeve. Therefore, as shown in FIG. 33a and 33b, the inner cam 122 positively urges the follower arm 114 outward to stretch the sleeve. The pins stretch the lower portion of the sleeve while the upper portion remains unstretched until the bottle is inserted as seen in FIG. 33A.

Each bottle 16 is lifted tipward through the center of one of the sleeving stations 22 and into a sleeve 20 by an elevator 36. Each plenum ring 116 is pressurized as a bottle approaches the stretched sleeve to provide a lubricating gas film between the bottle 16 and the sleeve. The frictional force between the stretched sleeve and the pins 108 is greater than that between the bottle and the sleeve at this stage. Thus, the sleeve remains securely in position on the pins 108 as the bottle moves into the sleeve. The air pressure to the pins 108 is turned off once the sleeve trailing edge passes over the wide portion of the bottle. In the absence of the gas film, the frictional force between the sleeve and the bottle increases.

In the preferred and illustrated method, grippers 162 hold each sleeve against each bottle and move with each bottle and sleeve for a portion of the cycle to ensure maintenance of accurate placement of the sleeves on the bottles. As seen in FIG. 33c, the grippers 162 release each bottle as the associated cam follower follows the ramp of the associated gripper cam during the downward elevator movement.

The sleeved bottles pass downwardly through the sleeving stations as the elevators are lowered. The carousel 32 then carries the sleeved bottles to the output star-wheel conveyor 106. The sleeving process is a smooth, continuous process without intermittent motion. The smooth, continuous nature of the sleeving process enables very high speeds to be achieved. In an experimental machine made in accordance with the drawings, sleeving rates of 400-500 bottles per minute have been achieved.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. A method of applying inherently resilient tubular sleeves to objects comprising:
    a) sequentially delivering objects and sleeves, each one at a time to an associated one of a set of sleeving stations, the objected delivery including conveying the objects along an input path in a plane;
    b) sequentially expanding and stretching each sleeve to a cross-sectional configuration generally corresponding to the cross-sectional configuration of an object to be sleeved;
    c) relatively moving an expanded sleeve and a delivered object vertically to position the expanded sleeve around the delivered object;
    d) introducing fluid to provide a lubricating gas film between the expanded sleeve and the delivered object concurrently with the relative motion step thereby facilitating the positioning of the expanded sleeve on the delivered object;
    e) thereafter stopping the fluid flow to allow the inherent resiliency of the sleeve to shrink the sleeve into circumferential engagement with the object; and,
    f) removing each delivered object from its station by moving it along an exit path at a level spaced from said plane.

2. A method according to claim 1 further comprising the step of removing said lubricating gas film to increase friction between said sleeve and said object once said sleeve is positioned at a predetermined location on said object.

3. A method according to claim 2 including the step of holding said sleeve against said object to ensure its position on the object.

4. A machine for applying sleeves to objects such as bottles comprising:
    a) a rotary carousel supporting a plurality of circumferentially spaced sleeving stations;
    b) an object conveyor for sequentially delivering objects to be sleeved to a pick-up location defined by the carousel;
    c) a variable pitch screw disposed longitudinally of and adjacent to the conveyor upstream from the pick-up location, the screw being adapted to space objects along the conveyor to deliver objects sequentially to the pick-up location in registration with the sleeving stations as rotation of the carousel sequentially positions the sleeving stations at the pick-up location;
    d) each of the sleeving stations including an object support pedestal and a sleeve stretching and delivery mechanism;
    e) the sleeving stations also each including a position shifting means operatively connected to its stations's pedestal and mechanism for relatively shifting its pedestal and the mechanism toward one another for positioning a sleeve around a pedestal-supported object, the relatively shifting including elevating the pedestal, the shifting means also being for moving its mechanism and platform away from one another to ready the two for a subsequent sleeve positioning;
    f) a sleeve supply structure positioned above the carousel including delivery means for delivering of sleeves sequentially to the sleeving station in synchronism with the rotation of the carousel;
    g) said sleeving stations each including gas film means to develop a lubricating film of gas between a sleeve and an object being sleeve as the pedestal and the mechanism are shifted toward one another to place a stretched sleeve around such object; and
    h) an output conveyor for removing sleeved objects from the carousel at a level different than the level of object delivery by the object conveyor.

5. The machine of claim 4 wherein the sleeve stretching and delivery mechanism includes tubular pins which form a part of said gas film means.

6. The machine of claim 4 wherein the sleeve supply structure is adapted to support a length of sleeves joined end to end along lines of weakness and includes a sleeve guide means, a sleeve feeding means for feeding said length of sleeves through said guide means, wherein said guide means forms opposed, longitudinal, inward folds in such sleeves as said length of sleeves are fed through said guide means to create a tendency in said sleeves to spring open when free of said guide means and, a sleeve transporter for separating a terminal one of said sleeve along its line of weakness joining it to the remainder of the length and for positioning said sleeve on a sleeve stretching and delivery mechanism for placement on an object.

7. An apparatus according to claim 6 wherein said sleeve feeding means comprises a powered a pair of nip rollers.

8. An apparatus according to claim 6 wherein said guide means comprises a set of opposed longitudinal guides which form a tapered path along which said length of sleeves are drawn, each guide forming one of said longitudinal folds.

9. A machine according to claim 4, wherein the position shifting means includes a plurality of cam followers and wherein each of said pedestals is connected to an associated one of the cam followers and wherein each of said cam followers engages a cam independent of said carousel, and wherein said cam is configured to move said pedestals longitudinally in accordance with a predetermined cycle.

10. The machine of claim 4 wherein the object conveyor delivers objects sequentially to said pedestals when said pedestals are in a lowered condition and the output conveyor removes sleeved object from said pedestals while said pedestals are in a raised condition.

11. A method according to claim 1 wherein the object removed step is performed at a level above said plane.

12. A method of supplying film sleeve in positions around objects comprising:
feeding a length of film sleeves joined end to end along lines of weakness along a path, the path extending through a guide means; forming opposed, longitudinal, inward folds in said sleeves with said guide means such that said sleeves tends to spring open when free of said guide means;
separating a terminal one of said sleeves along its line of weakness joining it to the remainder of the length;
transporting said separated sleeve to a sleeve holder; and,
allowing said folds to cause said separated sleeve to spring open and placing said open separated sleeve on said sleeve holder for placement on an object.

13. An apparatus for putting plastic film sleeves on bottles comprising:
a sleeve supply station for supporting a length of sleeves joined end to end along lines of weakness;
a sleeve guide means;
a sleeve feeding means for feeding said length of sleeves through said guide means, said guide means including a set of opposed longitudinal guides which form a tapered path along which said length of sleeves are drawn to form opposed, longitudinal, inward folds in such sleeves as such length of sleeves is fed through said guide means to create a tendency in such sleeves to spring open when free of said guide means; and,
a sleeve transporter for separating a terminal one of such sleeves along its line of weakness joining it to the remainder of its length of sleeves and for positioning such sleeve on a sleeve holder for placement on a bottle.

14. An apparatus according claim 13, wherein said guide means comprises a set of opposed longitudinal guides which form a tapered path along which said length of sleeves is drawn, each guide forming one of said longitudinal folds.

15. A machine for applying sleeves to objects such as bottles comprising:

a) a rotary carousel supporting a plurality of circumferentially spaced sleeving stations;
b) an object conveyor for sequentially delivering objects to be sleeved to a pick-up location defined by the carousel;
c) a variable pitch screw disposed longitudinally of and adjacent to the conveyor upstream from the pick-up location, the screw being adapted to space objects along the conveyor to delivery objects sequentially to the pick-up location in registration with the sleeving stations as rotation of the carousel sequentially positions the sleeving stations at the pick-up location;
d) each of the sleeving stations including an object support pedestal and a sleeve stretching and delivery mechanism;
e) the sleeving stations also each including a position shifting means operatively connected to its station's pedestal and mechanism for relatively shifting its pedestal and the mechanism toward one another for positioning a sleeve around a pedestal-supported object and for moving its mechanism and platform away from one another to ready to two for a subsequent sleeve positioning;
f) a sleeve supply structure positioned above the carousel including delivery means for delivering of sleeves sequentially to the sleeving station in synchronism with the rotation of the carousel;
g) said sleeving stations each including gas film means to develop a lubricating film of gas between a sleeve and an object being sleeved as the pedestal and the mechanism are shifted toward one another to place a stretched sleeve around such object; and,
h) said sleeve supply structure being adapted to support a length of sleeves joined end to end along lines of weakness and including:
i) a sleeve guide means; ii) a sleeve feeding means for feeding said length of sleeves through said guide means;
iii) said guide means being for forming opposed, longitudinal, inward folds in such sleeves as such length of sleeves is fed through said guide means to create a tendency in such sleeves to spring open when free of said guide means; and
iv) a sleeve transporter for separating a terminal one of such sleeves along its line of weakness joining it to the remainder of its length and for positioning such sleeve on a sleeve stretching and delivery mechanism for placement on an object.

16. An apparatus according to claim 15 wherein said guide means comprises a set of opposed longitudinal guides which form a tapered path along which such length of sleeves is drawn, each guide forming one of such longitudinal folds.

17. The method of claim 1 wherein the objects moving along the exit path are moving in a direction generally opposite the movement of objects along said input path.

18. The machine of claim 4 wherein the object conveyor delivers objects along a path in a direction generally opposite the direction of an output path along which sleeved objects are taken by the output conveyor.

* * * * *